United States Patent
Mitsuji et al.

(10) Patent No.: US 10,104,441 B2
(45) Date of Patent: Oct. 16, 2018

(54) CONTENT RENTAL SYSTEM

(71) Applicant: Apple Inc., Cupertino, CA (US)

(72) Inventors: Hiro Mitsuji, San Francisco, CA (US); Alan Ward, Boulder, CO (US); Mihailo Despotovic, Santa Clara, CA (US); Sam Gharabally, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/168,833

(22) Filed: Jan. 30, 2014

(65) Prior Publication Data

US 2014/0215510 A1    Jul. 31, 2014

Related U.S. Application Data

(63) Continuation of application No. 12/241,376, filed on Sep. 30, 2008, now Pat. No. 8,677,430.

(60) Provisional application No. 61/019,163, filed on Jan. 4, 2008, provisional application No. 61/021,012, filed on Jan. 14, 2008.

(51) Int. Cl.
| | |
|---|---|
| *H04N 7/167* | (2011.01) |
| *H04N 21/258* | (2011.01) |
| *H04N 21/6334* | (2011.01) |
| *H04N 21/8355* | (2011.01) |
| *H04N 21/266* | (2011.01) |
| *H04N 21/254* | (2011.01) |

(52) U.S. Cl.
CPC ....... *H04N 21/6334* (2013.01); *H04N 7/1675* (2013.01); *H04N 21/2541* (2013.01); *H04N 21/25816* (2013.01); *H04N 21/25875* (2013.01); *H04N 21/26613* (2013.01); *H04N 21/63345* (2013.01); *H04N 21/8355* (2013.01)

(58) Field of Classification Search
CPC .......... H04N 21/6334; H04N 21/2541; H04N 21/25816; H04N 21/25875; H04N 21/26613; H04N 21/63345; H04N 21/8355
USPC ... 725/1–8, 25–31, 37–63, 68, 86–104, 131, 725/139, 151; 705/901–912; 386/349
See application file for complete search history.

(56) References Cited

U.S. PATENT DOCUMENTS

| | | | |
|---|---|---|---|
| 6,166,730 A | 12/2000 | Goode et al. | |
| 6,609,253 B1* | 8/2003 | Swix et al. | 725/88 |
| 2001/0036271 A1 | 11/2001 | Javed | |
| 2003/0040962 A1 | 2/2003 | Lewis | |
| 2005/0034171 A1 | 2/2005 | Benya | |
| 2005/0091069 A1* | 4/2005 | Chuang | 705/1 |
| 2005/0204019 A1* | 9/2005 | Flynn et al. | 709/219 |
| 2006/0248235 A1 | 11/2006 | Eyer | |
| 2008/0103945 A1* | 5/2008 | Cooper et al. | 705/28 |
| 2008/0152305 A1* | 6/2008 | Ziegler | 386/94 |

* cited by examiner

*Primary Examiner* — Yassin Alata
(74) *Attorney, Agent, or Firm* — Blank Rome LLP

(57) ABSTRACT

A content rental system includes one data store for storing rental content. The content rental system also includes a content server for transferring content to one viewing device based upon a received request. The content server is further configured to authorize the transfer of the content from the viewing device to another viewing device.

21 Claims, 23 Drawing Sheets

CONTENT RENTAL SYSTEM

CLAIM OF PRIORITY

This application is a continuation of U.S. patent application Ser. No. 12/241,376, filed Sep. 30, 2008 entitled "Content Rental System" and claims priority under 35 USC §119(e) to U.S. Provisional Patent Application Ser. No. 61/019,163, filed on Jan. 4, 2008, and U.S. Provisional Patent Application Ser. No. 61/021,012 filed on Jan. 14, 2008, the entire contents of which are hereby incorporated by reference.

BACKGROUND

This disclosure relates to a system for providing and managing rental of content such as video content.

Cinemas and theaters have a long history of providing movies to be viewed in a group environment. However, with the evolution of home electronics industry, equipment such as video cassette recorders (VCR) and digital videodisc (DVD) players may be used for movie viewing at a residence or other type of location. Along with current releases and older movies, other types of video content (e.g., television programs, etc.) may be reproduced and provided for rental by consumers. Correspondingly, a video rental industry has emerged to provide viewers with video content for nearly every interest and genre. For example, a consumer may visit a brick-and-mortar video rental store and select one or more DVDs for rental for a predefined period of time (e.g., three days, etc.). With the ever-expanding use of the Internet, movies and other types of video content may also be rented and downloaded electronically from Internet websites. By accessing a website, a customer may select a movie of interest and provide payment for the rental (e.g., by providing a credit card number). Correspondingly, the video content of the movie may be streamed to a web browser executing on the customer's computer system and rendered on a display.

SUMMARY

Disclosed herein are systems and methods for managing the rental of video content that may be viewed on one or more types of viewing devices. Additionally, the rented video content may be transferred from one viewing device to another viewing device. By checking-out video content from a video rental system, the content may be viewed initially on a first device. The video content may then be checked-in to the video rental system and checked-out for viewing on another viewing device if the customer and viewing device are recognized and authorized by the system. The number of subsequent devices on which the video content may be viewed can be limited to two, three or essentially any desired whole number depending on the business mode employed by the operator of the video renting system.

In one aspect of the disclosure, a content rental system includes one data store for storing rental content. The content rental system also includes a content server for transferring content to one viewing device based upon a received request. The content server is further configured to authorize the transfer of the content from the viewing device to another viewing device.

These and other aspects and features and various combinations of them may be expressed as methods, apparatus, systems, means for performing functions, program products, and in other ways.

Other features and advantages will be apparent from the description.

DETAILED DESCRIPTION

Figure 1:
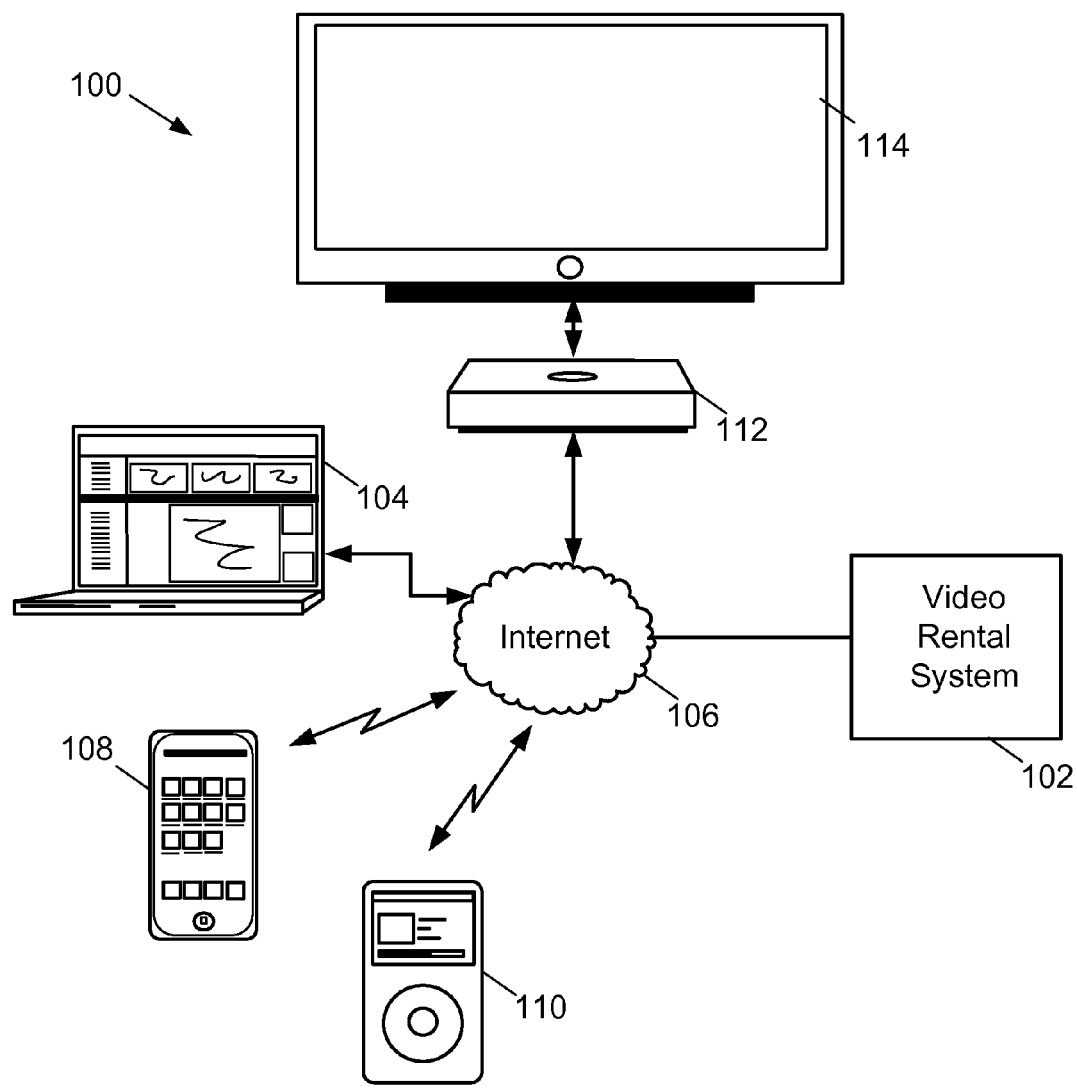
FIG. 1 is a block diagram of a video rental system in communication with a variety of viewing devices.

Referring to FIG. 1, a network environment 100 includes a video rental system 102 that allows customers to select and rent one or more video titles (e.g., movies, television shows, etc.) for selective playback on one or more electronic viewing devices associated with the customer. For example, a customer may send a rental request for a particular movie from a computer system 104 (e.g., a laptop computer) to the video rental system 102 via the Internet 106. In some arrangements, the rental request may be initiated by a software application, which transfers music, photo and video content (e.g., "iTunes" application from Apple, Inc. of Cupertino, Calif.), and is executed by the computer system 104. Along with the video selection, other information may be provided to the video rental system 102 such as payment information (e.g., credit card number), user information (e.g., user account number), etc. In some arrangements the request may also identify the particular viewing device that the user would like to view the video. For example, the computer system 104 may be used to view a selected movie, or, another device associated with the customer may be requested as the viewing destination. Typically, the video rental system 102 stores information that represents each device associated with a particular customer (e.g., registered with the video rental system 102 along with the customer). In this illustration, the video rental system 102 is aware of a cellular telephone 108 (e.g., an "iPhone" also from Apple, Inc. of Cupertino, Calif.), a media player 110 (e.g., an "iPod" from Apple, Inc.) and a digital media receiver 112 (e.g., an "Apple TV" also from Apple, Inc.) that is connected to a display 114.

Along with video content, other types of content may be rented a rental system. For example, audio content (e.g., music, lectures, etc.), data (e.g., graphics, text, etc.) and other types of content may be rented.

Once the request is received by the video rental system 102, the system attempts to authorize the rental transaction (e.g., check user identification information, check payment method, check content policy, etc.) and identify the destination of the video content (e.g., check registration of requested destination viewing device). Once the transaction has been authorized, the video rental system 102 initiates transfer of the appropriate video content (e.g., video files) to the requested destination. Additionally, one or more processes may be triggered by the video rental system 102 to execute other operations (e.g., payment collection).

Once a rental is granted, the video rental system may set one or more restrictions on viewing the video content. For example, the customer may be constrained to a predefined rental period of time (e.g., 30 days) during which the content may need to be viewed after being downloaded. The customer may also be constrained to a particular viewing period (e.g., 24 hours) during which viewing of the video content needs to be completed once playback of the video has initiated. Various other types of constraints and restrictions may also be implemented to provide reasonable rental and viewing periods. For example, if the customer is viewing a video, and the rental period (e.g., 30 days) and/or the viewing period (e.g., 24 hours) expires, the customer may still be allowed to complete viewing the video. However, the customer may be warned that if video playback is paused or stopped from this point in time forward, video playback may not be restarted.

During the rental period, the customer may also transfer the video content from one viewing device to another device. For example, the customer may initially request to view a particular piece of video content on the digital media receiver 112 and the corresponding display 114. At a later time, the customer may be interested in viewing the video content on the media player 110. By alerting the video rental system 102 to the customer's interest to transfer, the video content may be provided to the new destination device. In one arrangement, the video content may first be provided back to the video rental system 102, in effect to "check-in" the video content. A request may then be sent to the video rental system 102 to "check-out" and provide the video content to another viewing device (e.g., the media player 110). While managing the transfer of the video content from one device to another, the video rental system 102 may or may not account for this transfer in regards to the rental period and/or the viewing period. For example, the period of time needed to process a "check-in" and "check-out" request may be added to a rental period to account for the possibility of transfer delay.

As mentioned above, various types of video content may be provided. For example, standard definition (SD) and high definition (HD) video content may be rented for playback on one or more viewing devices (e.g., the digital media receiver 110). LC video content may also be rented for playback on a device capable of processing such video content (e.g., the computer system 104). Other features, which may also be selectable, may also be provided, for example, alternate audio (e.g., dubbed tracks, director's commentary, etc.), subtitles, chaptering, custom audio (e.g., Dolby Surround, audio mixing, stereo, etc.), closed captioning, down-mixing to stereo, etc.

In addition to managing rental activities, the video rental system 102 may also provide the functionality for purchasing video content which may then be freely transferred among viewing devices associated with the customer.

Figure 2:
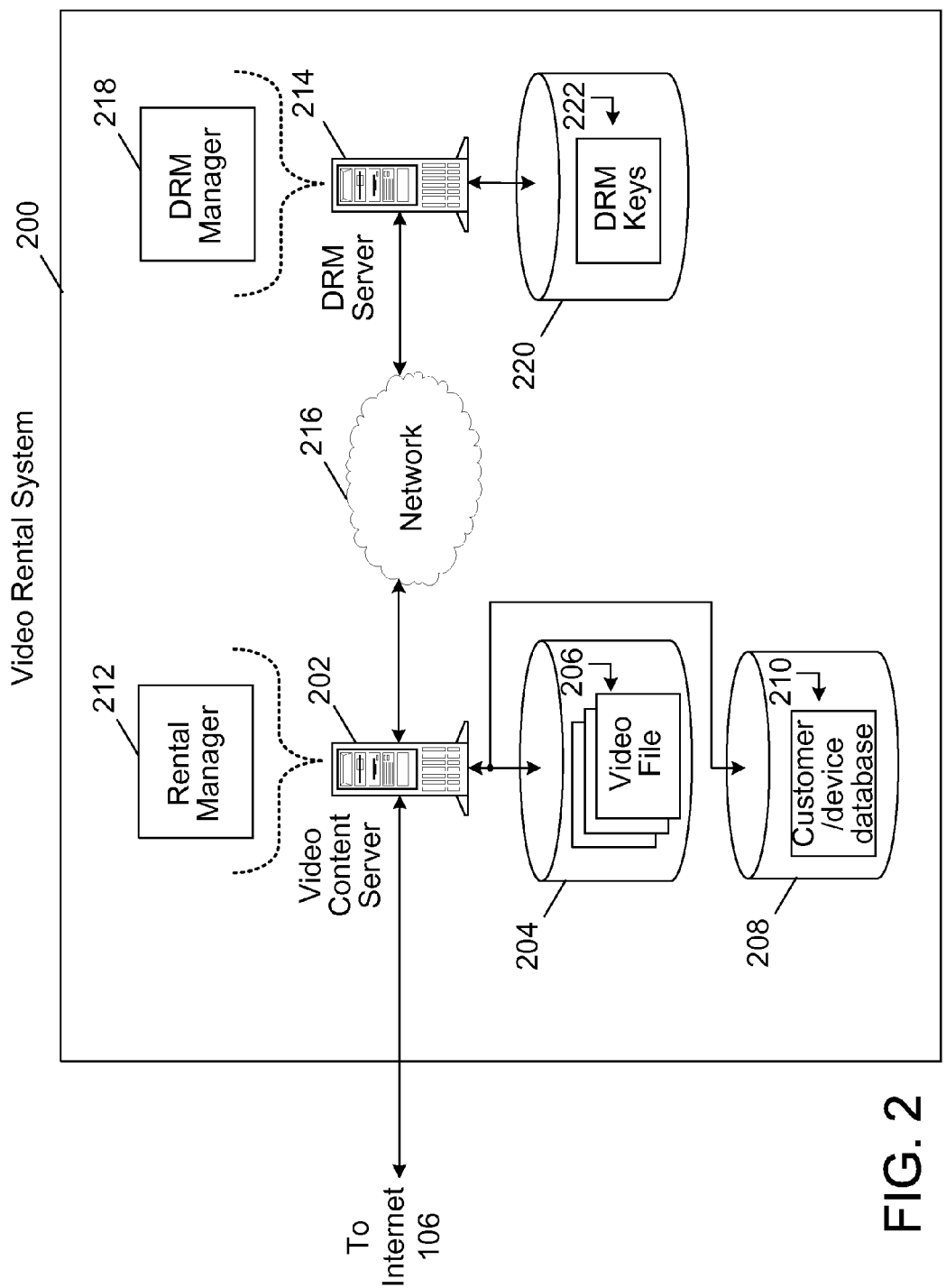
FIG. 2 is a block diagram of an exemplary video rental system.

Referring to FIG. 2, an exemplary video rental system 200 includes a video content server 202 that manages available video content, customer and viewing device information, and rentals. For example, in this arrangement, a storage device 204 illustrates the available video content that may be rented from the video rental system 200. Along with hard drives, CD-ROMs and redundant arrays of independent disks (RAIDs), one or more other data storing devices, techniques and methodologies may be implemented for video content storage. In this illustration, the rentable video content is represented by a group of video files 206. The video content server 202 is also in communication with another storage device 208 that stores information associated with customers, viewing devices, etc. For example, a customer/device database 210 may be stored in the storage device 208 and include information such as customer identification information, viewing device registration information, etc. Additional storage devices may also be in communication with the video content server 202 for additional information storage and to assist in video rental (and purchasing). Various types of data formats, structures and protocols may be used to represent information, for example, globally unique identifiers (GUIDs) may be used to identify particular information.

To process and manage rental requests (e.g., check-out requests, check-in requests, etc.), a rental manager 212 is executed on the video content server 202. For example, along with checking customer identification, authorizing transactions, and registering and tracking viewing devices associated with customers (e.g., computer systems, iPhones, iPods, AppleTv's, etc.), the rental manager 212 may provide other functionality such as providing rental suggestions (e.g., tracking and providing the most popular rentals, suggested selections for particular movie genres, new releases, etc.). Search functions along with browsing, previewing, providing third-party reviews, and customer account history and billing information may be managed by the rental manager 212. Generally, a manager such as the rental manager 212 is an automated or semi-automated process or component that may be executable by a computing device.

The video rental system 200 also includes a digital rights management (DRM) server 214 that is in communication with the video content server 202 via a network 216 (e.g., a local area network (LAN), wide area network (WAN), hardwire connection, etc.). In general, the DRM server 214 is associated with the identification, protection, monitoring and tracking of content policy including the management of policy holders. For example, the DRM server 214 may authorize the "check-in" and "check-out" of video content from the video content server 202. Upon receiving a rental request, the video content server 202 may send a request to the DRM server 214 to authorize the "check-out" of the requested video content. In some arrangements, a group of authorization requests may be provided and processed by the DRM server 214, or a single authorization request may be provided to the DRM server that represents multiple transactions. Once authorized (and after performing some eligibility checks), the video content server 202 may be contacted and instructed to release the video content for transfer. In this arrangement, such functionality is provided by a DRM manager 216 that is executed by the DRM server 214.

In some arrangements, the DRM manager 218 may assist in providing one or more security keys so that downloaded video content may be played back. For example, upon a rental being authorized by the rental manager 212, the DRM manager 218 may provide one or more DRM keys for delivery to the viewing device so that the video content may be decrypted. In this illustration, a storage unit 220 is in communication with the DRM server 214 and stores DRM keys 222 and possibly other types of DRM and security information. In one scenario, upon a customer initiating playback of a downloaded video on a viewing device, a request is provided to the video rental system 200 to provide the appropriate DRM key. Once the request is authenticated by the rental manager 212, the DRM manager 218 is requested to provide the appropriate DRM key, which in turn sends the key to the appropriate viewing device. While this particular arrangement uses DRM keys for video content decryption, other encryption and security techniques and methodologies may be implemented individually or in combination. For example, one DRM key may be provided for initiating a rental period of a video and another key may be provided for initiating a viewing period for the video.

Figure 3:
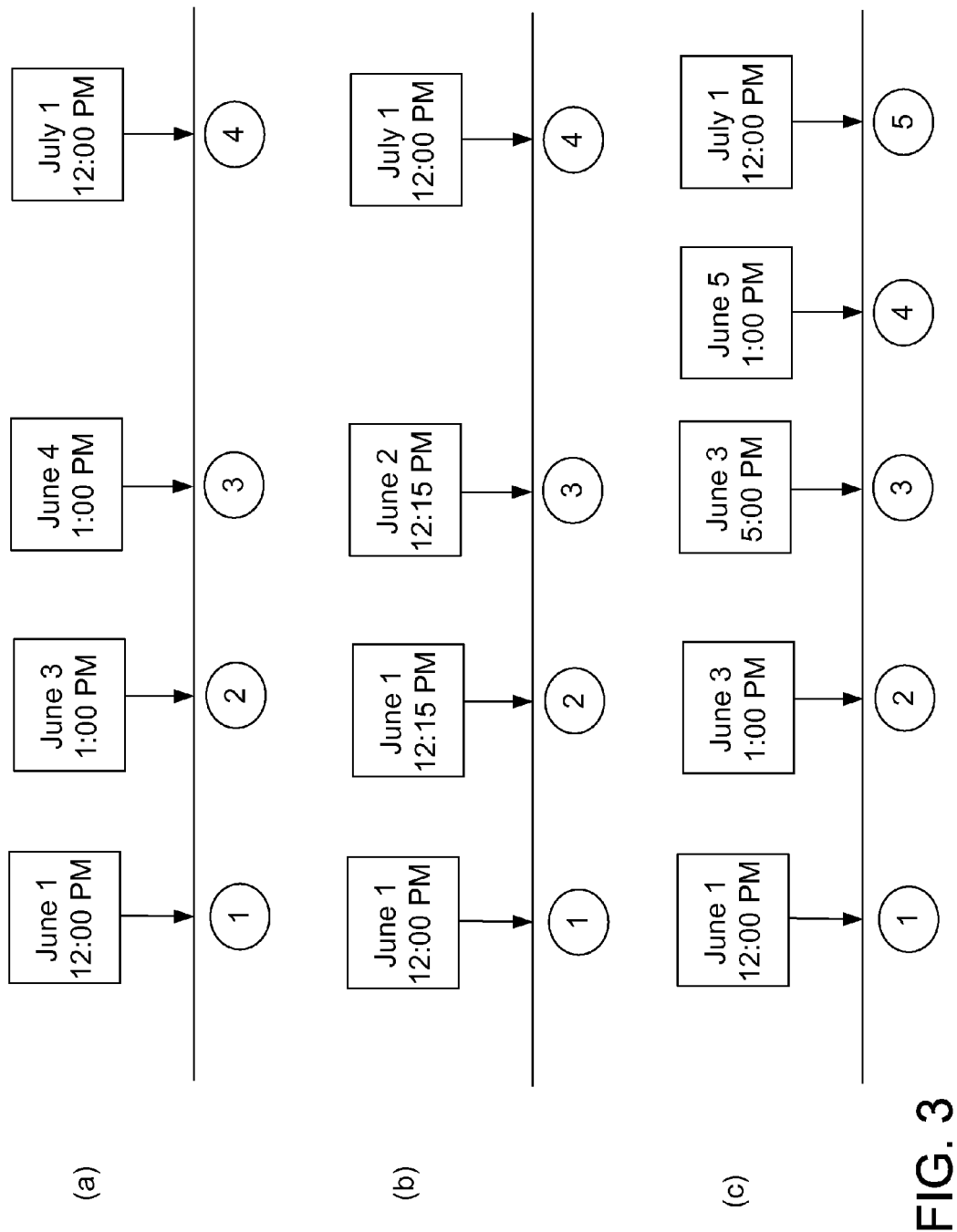
FIGS. 3 and 4 are timing diagrams representative of various video rental scenarios.

Referring to FIG. 3, a series of three timelines are illustrated to represent three rental scenarios and the restrictions applied by the rental period (e.g., 30 days) and the viewing period (e.g., 24 hours). In FIG. 3(a), at time 1 (i.e., 12:00 PM, June 1), video content has been requested and downloaded from the video rental system 200. Correspondingly at time 1, the thirty-day rental period begins and is tracked by the video rental system. At time 2 (i.e., 1:00 PM, June 3), the customer initiates viewing of the video content on a viewing device, thereby triggering the twenty-four hour viewing period. Additionally, a DRM key is provided from the video rental system to the viewing device for video decryption. At time 3 (i.e., 1:00 PM, June 4) the twenty-four hour period has expired and the video content may no longer be viewed. Since time 3 cuts off the possible viewing of the movie, time 4 (i.e., 12:00 PM, July 1), which represents the expiration of the thirty-day rental period, is irrelevant for this scenario in regards to restricting the viewing of the video content.

In FIG. 3(b), a time series illustrates a scenario in which a customer starts viewing before the downloading of video content is complete. At time 1 (i.e., 12:00 PM, June 1) a rental request is provided by a customer and approved by the video rental system. Additionally, at time 1 downloading of the video content is initiated. At time 2 (i.e., 12:15 PM, June 1), the customer begins viewing the video content before downloading is complete. Accordingly, a DRM key is provided and the twenty-four hour content viewing period starts at time 2 and expires at time 3 (i.e., 12:15 PM, June 2). As such, the end of the thirty-day rental period, time 4 (i.e., 12:00 PM, July 1) does not factor into the scenario if viewing is complete by time 3.

In FIG. 3(c), a time series illustrates a scenario in which viewing of a rented video is paused. At time 1 (i.e., 12:00 PM, June 1), a rental request is processed and the video content of interest is downloaded, thereby triggering the thirty-day rental period. At time 2 (i.e., 1:00 PM, June 3), upon being initiated by the customer, a DRM key is delivered and viewing of the video content begins, thereby initiating the twenty-four hour viewing period. At time 3 (i.e., 5:00 PM, June 3), the customer pauses playback of the video content until time 4 (i.e., 1:00 PM, June 5), approximately almost two days later. While, the twenty-four hour viewing period has expired by time 4, the customer is able to continue viewing of the video content so long as the video is not paused a second time (or stopped). In some arrangements, upon restarting playback of the video content after the twenty-four hour viewing window has expired, a warning (e.g., a graphic, audible tone, etc.) is displayed over the video content to alert the customer not to pause or stop the video. Similar to the scenarios described in FIGS. 3(a) and (b), since viewing of the video content is being restricted by the twenty-four hour viewing period, expiration of the thirty-day rental period, at time 4 (i.e., 12:00 PM, July 1) is irrelevant for this scenario.

Figure 4:
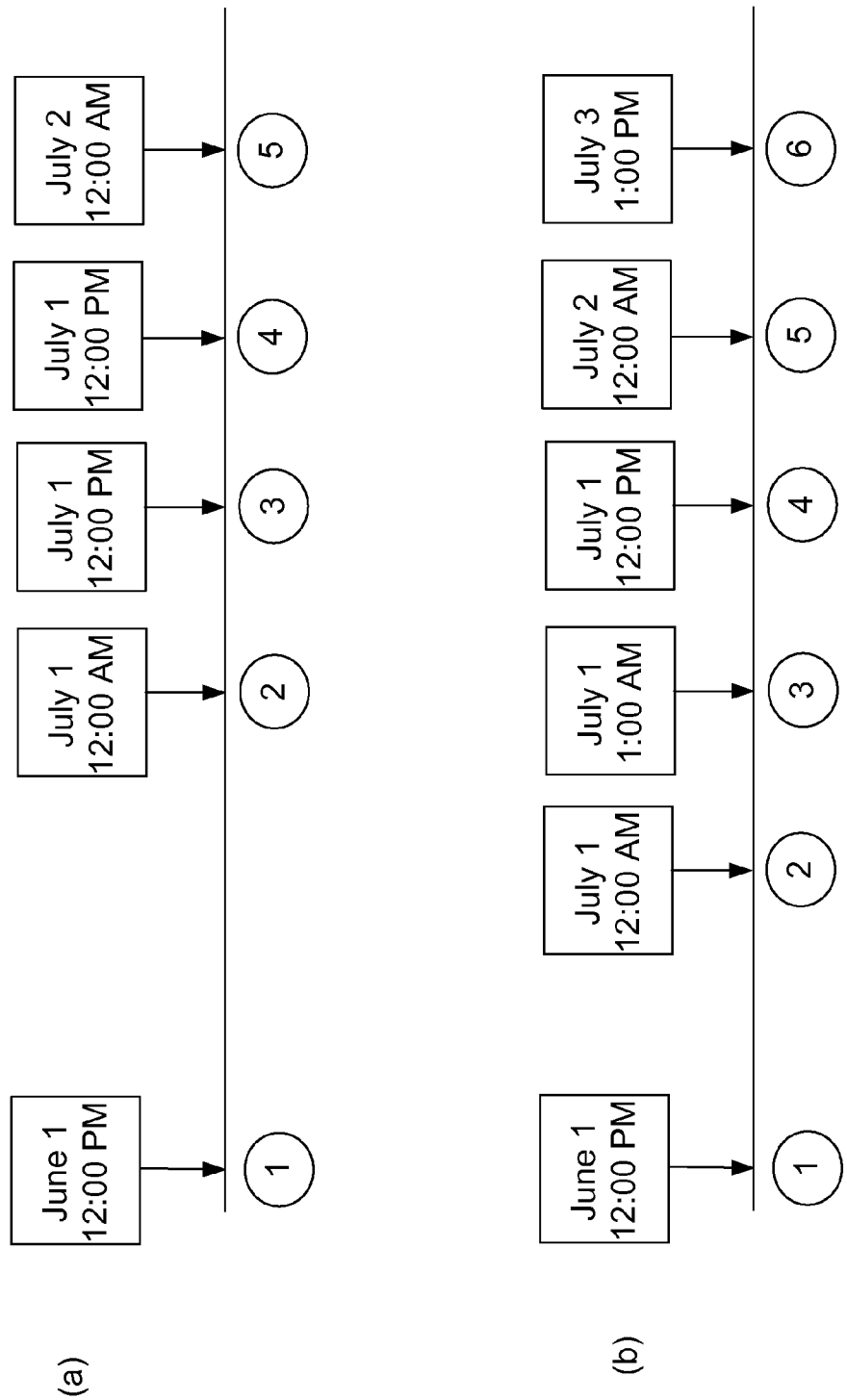

Referring to FIG. 4, two additional timelines are illustrated that also represent viewing scenarios. Both timelines are associated with scenarios in which the thirty-day rental period is exceeded. In FIG. 4(a), once again at time 1 (i.e., 12:00 PM, June 1) a video rental is initiated by a customer, the selected video content is downloaded and the thirty-day rental period initiates. At time 2 (i.e., 12:00 AM, July 1), which is twenty-nine days into the rental period, the customer initiates viewing of the video and delivery of the appropriate DRM key. Thereby, the twenty-four hour viewing period starts at time 2. At time 3 (i.e., 12:00 PM, July 1) the customer stops playback of the video content. At time 4 (i.e., 12:00 PM, July 1) the thirty-day rental period expires, and in this implementation based upon the expiration of this period, the customer is blocked from restarting playback of the video. As such, for any time after time 4, including time 5 (i.e., 12:00 AM, July 2) which represents the expiration of the twenty-four hour viewing period, the customer is unable to view the video.

In FIG. 4(b), a timeline represents the scenario in which video playback is initiated twenty-nine days after rental, is paused, and passes beyond a thirty-day rental period. Once again, at time 1 (i.e., 12:00 PM, June 1) a video rental is initiated by a customer, the selected video content is downloaded and the thirty-day rental period initiates. At time 2 (i.e., 12:00 AM, July 1), which is twenty-nine days into the thirty-day rental period, a DRM key is received and viewing starts along with the twenty-four hour viewing period. At time 3 (i.e., 12:00 AM, July 1) the customer pauses the video playback (i.e., one-hour after initiating viewing of the video). Time 4 (i.e., 12:00 PM, July 1) represents the time when the thirty-day rental period expires and time 5 (i.e., 12:00 AM, July 2) represents the expiration of the twenty-four hour viewing period. At time 6 (i.e., 1:00 PM, July 3), the customer attempts to restart playback of the video content, and is allowed, in this arrangement, to continue viewing of the video so long as the playback is not paused (a second time) or stopped prior to completion of the video content.

Figure 5:
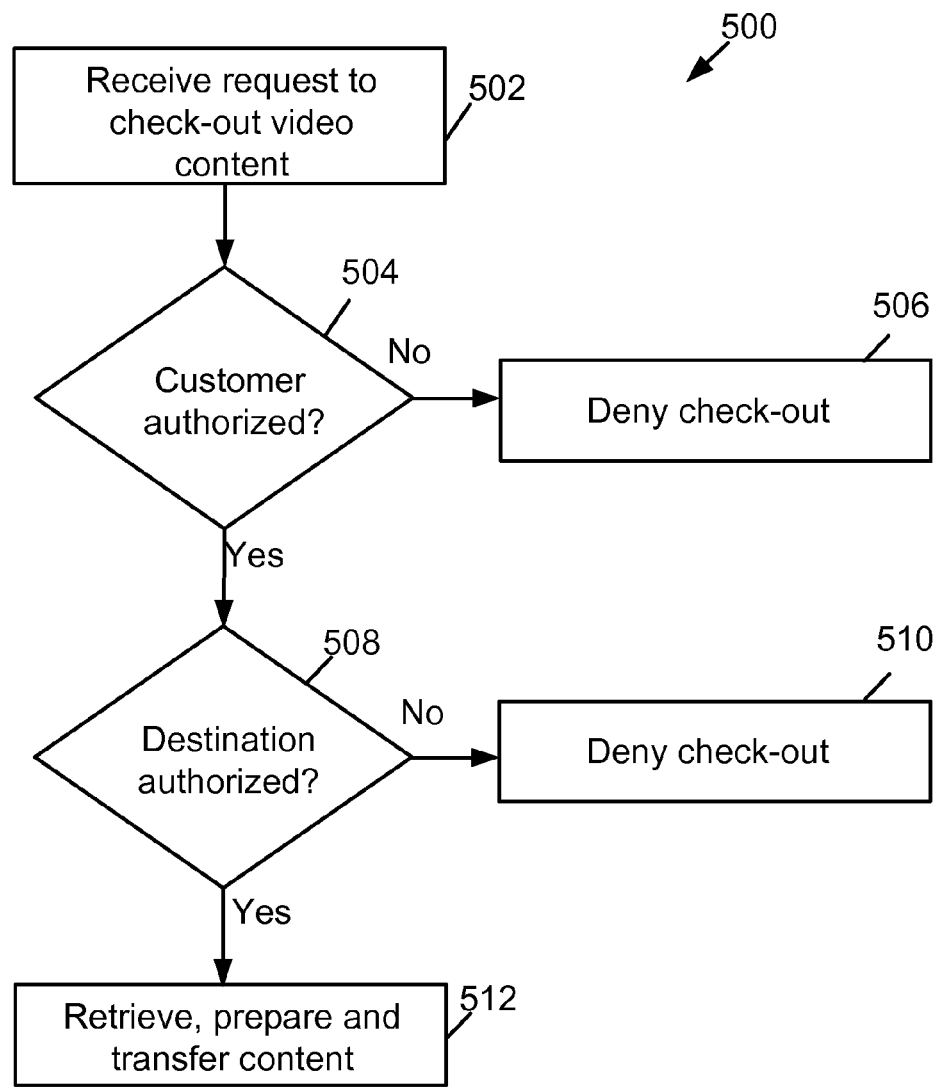
FIGS. 5 and 6 are flow charts that represent operations of a video rental manager.

Referring to FIG. 5, a flowchart 500 represents some of the operations of the rental manager 212 (shown in FIG. 2). As mentioned above, the rental manager 212 may be executed at the video content server 202, which may be implemented as a computer system or other type of computation device. Along with being executed at a single site (e.g., video content server 202), operation execution may be distributed among two or more computation devices. For example, some operations may be executed by two or more servers.

Operations of the rental manager 212 may include receiving 502 a request to check-out video content from the video rental system. Upon receipt of the request, operations of the rental manager 212 may include determining 504 if the customer is authorized to make such a request. For example, the request may be checked for appropriate customer identification information to authorize the customer. By comparing the request information with data stored in the customer/device database 210, authorization may be determined. If the customer is not authorized, the check-out of the video content may be denied 506. If the user is determined to be authorized, operations of the rental manager 212 may include determining 508 if the destination device identified in the request is authorized. For example, the customer/device database 210 may be consulted to determine if the destination device is registered with the customer and is appropriate for receiving the video content. If the destination device is not authorized, check-out of the video content may be denied 510. If the destination device and the customer are authorized, operations of the rental manager 212 may include retrieving, preparing and transferring 512 the requested video content to the destination device.

Figure 6:
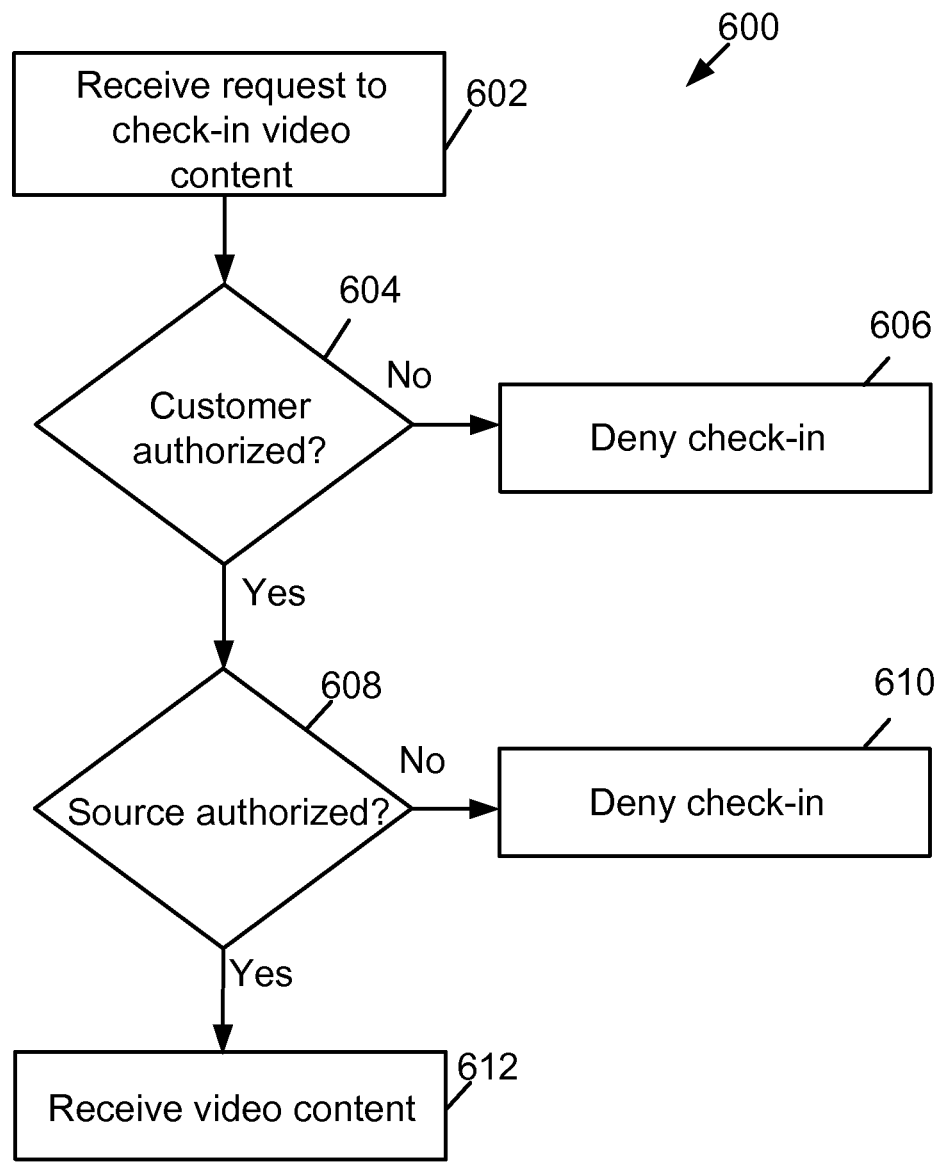

Referring to FIG. 6, a flowchart 600 represents some additional operations of the rental manager 212 (shown in FIG. 2). As mentioned above, the rental manager 212 may be executed at the video content server 202, which may be implemented as a computer system or other type of computation device. Along with being executed at a single site (e.g., video content server 202), operation execution may be distributed among two or more computation devices. For example, some operations may be executed by two or more servers.

Operations of the rental manager 212 may include receiving 602 a request to check-in video content from a source device (e.g., a computer system, etc.). Upon receipt of the request, operations of the rental manager 212 may include determining 604 if the requesting-customer is authorized to make such a request. For example, the request may be checked for appropriate customer identification information to authorize the customer. By comparing the request information with data stored in the customer/device database 210, authorization may be determined. If the customer is not authorized, the check-in of the video content may be denied 606. If the customer is determined to be authorized, operations of the rental manager 212 may include determining 608 if the source device identified in the request is authorized. For example, the customer/device database 210 may be consulted to determine if the source device is registered with the customer. If the source device is not authorized, check-in of the video content may be denied 610. If the source device and the customer are authorized, operations of the rental manager 212 may include receiving 612 the video content from the source device.

Additionally, the rental manager 212 may determine whether the destination device is capable of viewing a type or format of video content. For example, the rental manager 212 may determine whether a rented video in standard definition (SD) or high definition (HD) may be transferred to another device, and that the transfer to device is capable of playing the rented video. If the transfer to device is not capable of playing the particular format or definition of the video, then the transfer of the rented video would not be authorized. Also, the transfer to device may be polled or queried to determine if the device has a sufficient amount of available storage to store the rented video. If the transfer to device does not have sufficient storage, then the transfer would not be authorized, and an appropriate message to the customer may be generated identifying the low storage condition on the transfer to device. However, the transfer of the video may be queued as discussed below.

Figure 7:
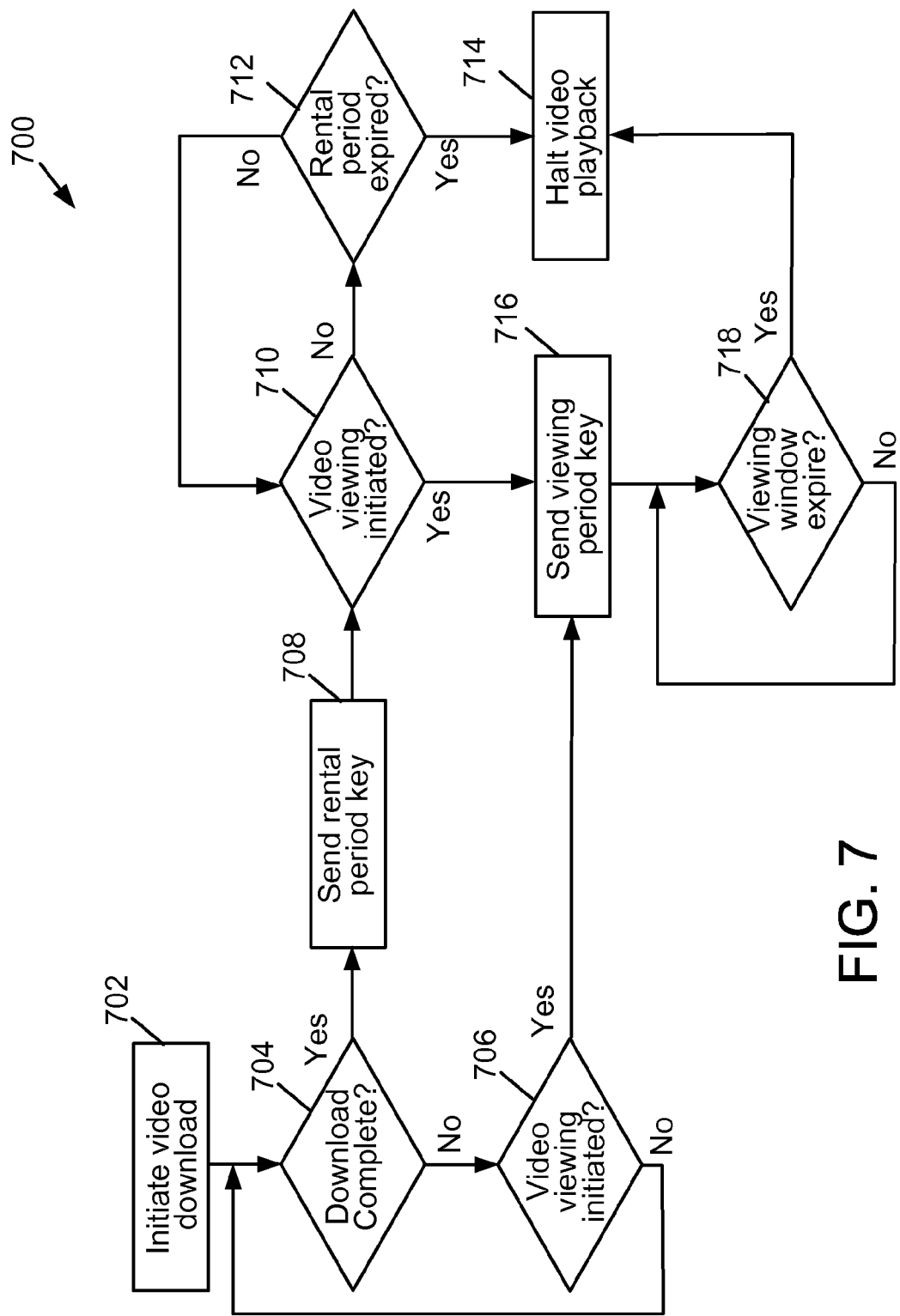
FIG. 7 is a flow chart that represents operations of a digital rights management (DRM) manager.

Referring to FIG. 7, a flowchart 700 represents some of the operations of the DRM manager 218 (shown in FIG. 2). As mentioned above, the DRM manager 218 may be executed at the DRM server 214, which may be implemented as a computer system or other type of computation device. Along with being executed at a single site (e.g., DRM server 214), operation execution may be distributed among two or more computation devices. For example, some operations may be executed by two or more servers. The DRM manager 218 may also be executed by another computation device such as the video content server 202.

Operations of the DIM manager 218 may include initiating 702 downloading of video content to an appropriate destination device (e.g., a viewing device). For example, the rental manager 212 may identify the appropriate destination device. Once initiated, operations may include determining 704 if the download has been completed and determining 706 if viewing of the video content has been initiated, if the download is not complete. If video viewing has not been complete, operations may include returning to determine 704 if the downloading of the video has been completed. If the download is complete, operations may include sending a rental period key to the destination device. Typically delivery of the rental period key initiates the rental period (e.g., thirty days) and the DRM manager 218 tracks this period as it runs down.

Operations also include determining 710 if viewing of the video content has been initiated. If viewing has not started, the DRM manager 218 may determine 712 if the rental period has expired, and if it has expired video playback may be halted 714, else, if not expired, operations may include returning to determine 710 if video viewing has been initiated. If viewing has been initiated, as determined 706 after download or determined 710 after sending the rental period key 708, operations may include sending 716 a viewing period key to the destination device. Next, operations may include determining 718 if the viewing period (e.g., twenty-four hours) has expired. If expired, video playback is halted, else, the DRM manager 218 returns to determined 718 if the viewing window has expired.

In one configuration of the system, the destination device must be in communication (e.g. via the Internet) with the rental manager 212 to initiate the viewing of the rented video. For example, the rented video may be stored on a destination device. When the customer begins to view the video, the destination device will communicate with the rental manager 212 and the appropriate keys are provided to decrypt the rented video content for viewing. In this configuration, once the decryption keys are obtained, the destination device then no longer needs to communicate with the rental manager 212 for continued viewing.

In another configuration of the system, after its expiration the rented content may be automatically deleted from the destination device. For example, when a rented video expires, the destination device may check the rented video content to determine if any of the video files may be deleted, thereby releasing storage space.

In another configuration of the system, the rented video content may be queued to a destination device. One reason may be because of storage constraints of the destination device. As rented video content is deleted from the destination device, then queued content is received by the destination device, thereby enabling the video rental for viewing. The queuing of the content may be managed by the rental manager 212. The customer may via the destination device (or directly via the Internet) view the video rentals in the queue. The customer may be charged for the rental of the video when the video is actually loaded onto the destination device.

Figure 8:
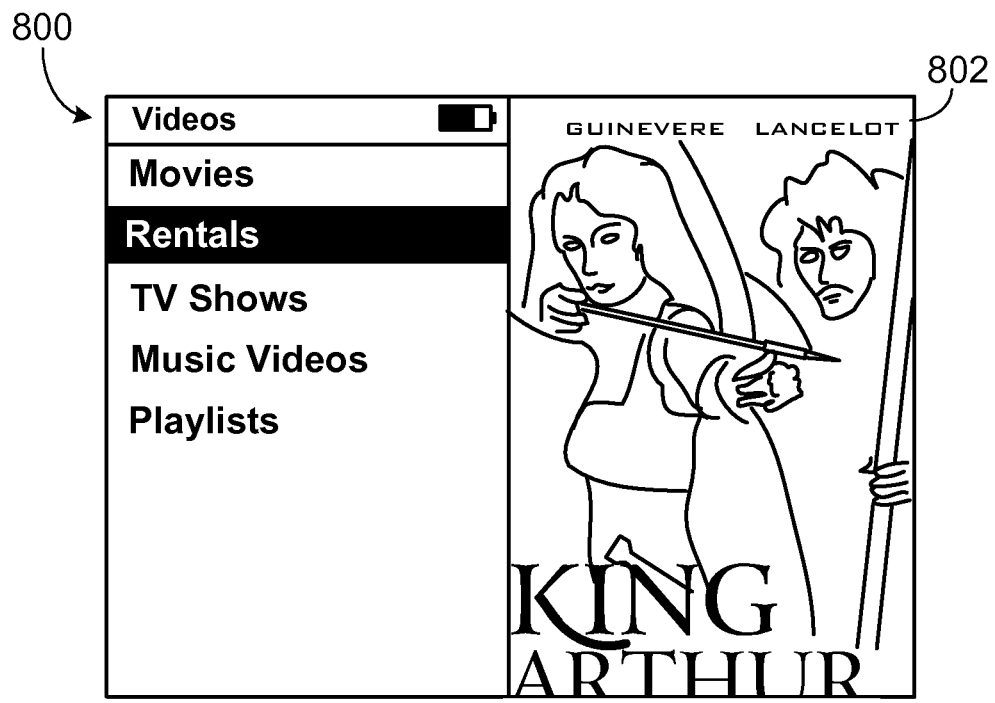
FIGS. 8-17 are graphical user interfaces.

Referring to FIG. 8, a graphical user interface (GUI) 800 is presented that illustrates one arrangement in which a user may interact with a viewing device (e.g., an iPhone, iPod, AppleTV, etc.) to provide user input and to receive information from the video rental system 102. Along with providing other types of selectable content (e.g., purchased movies, TV shows, music videos, playlists, etc.), the GUI 800 presents a menu entry labeled "Rentals". By selecting or highlighting this menu entry, the user is presented one or more images associated with each video title that has been transferred from the video rental system 102 to the viewing device. For example, an image 802 depicting cover art associated with one particular video title. One or more graphical techniques such as fading may be used to present a series of video titles. For example, as the image 802 that depicts one video title fades out, another image that depicts cover art associated with another video title may be presented. Other presentation techniques may also be implemented for presenting the video titles.

Figure 9:
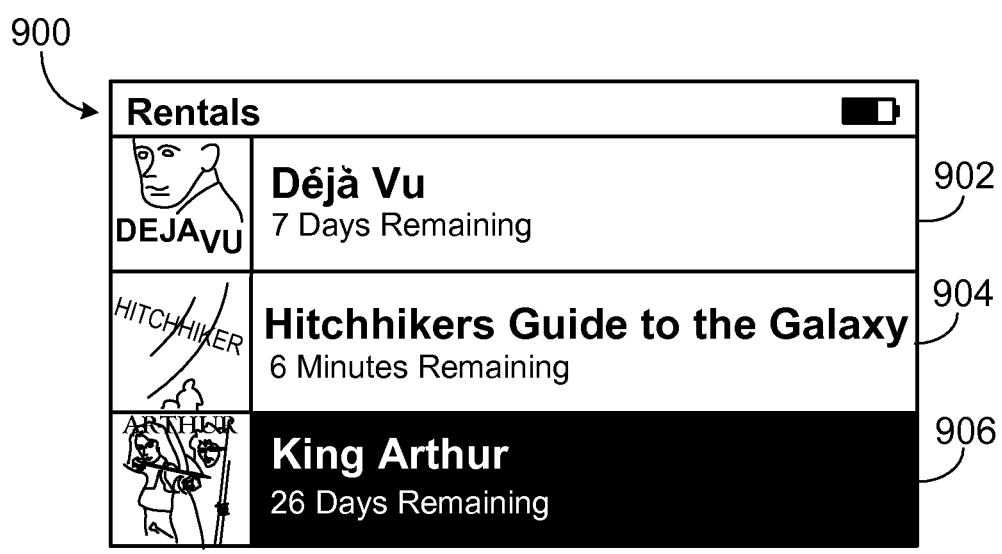

Referring to FIG. 9, a GUI 900 is presented that illustrates a group of video titles that have been rented, transferred to the viewing device and are ready to be viewed. In this particular example, three video title entries 902, 904 and 906 are presented and may be selected for viewing by a user. In addition to illustrating cover art that corresponds to each video title, the remaining amount of time associated with the rental period and/or viewing period is presented. For example, the video title entry 902 reports that seven days are remaining on the rental period (e.g., thirty days) for this video title (i.e., Déjà Vu). Similarly, video entry 906 reports that twenty-six days are remaining for this video title (i.e., King Arthur). The video entry 904 reports that six minutes remain for the viewing period for this video title (i.e., Hitchhikers Guide to the Galaxy). By providing this information, a user is quickly alerted to the amount of time remaining in each title's rental period and viewing period as provided by the video rental system 102. In some arrangements, the times may be presented in two different colors to quickly catch the attention of a user. For example, time remaining in a rental period may be provided in the color blue while time remaining in a viewing period may be provided in the color red.

From this list of rented video titles, a particular title may be selected for viewing. In this particular example, the video entry 906 is presented in a highlighted manner to illustrate that the entry has been selected for viewing by a user.

Various types of timing techniques and methodologies may be implemented to control rental periods and viewing periods. For example, a clock located at the video rental system 102 may be used as a master clock to set and monitor rental and viewing periods. In some arrangements, clocks local to the viewing devices or computer systems external to the video rental system may be used for timing signal generation.

Figure 10:
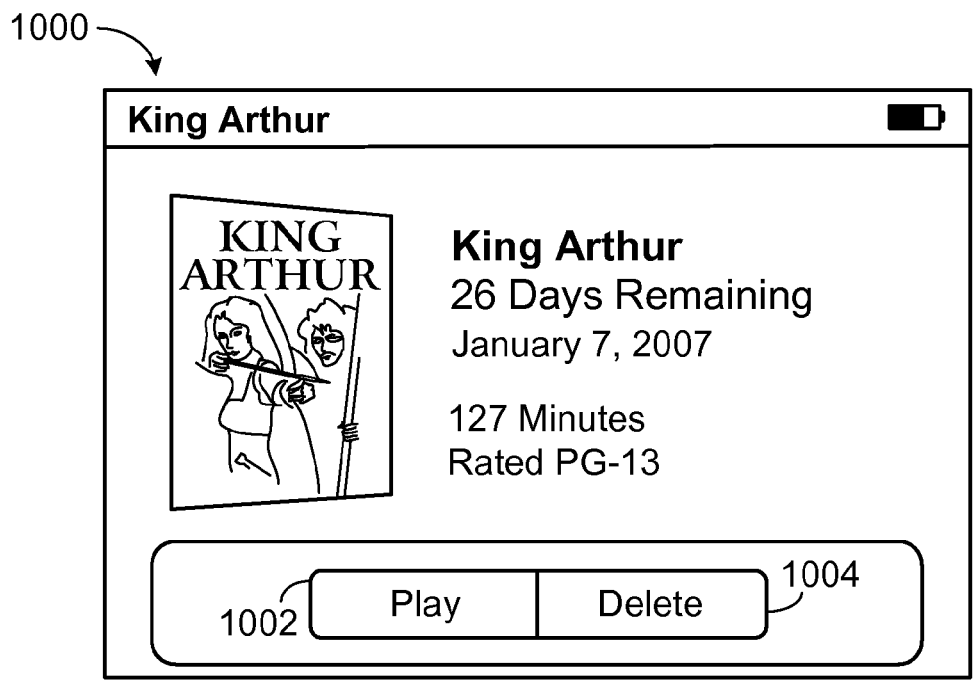

Referring to FIG. 10, once a video title has been selected for viewing, a GUI 1000 may be presented that provides information particular to the video title. For example, along with the name of the video title (e.g., King Arthur) and cover art associated with the title, the number of days remaining in the rental period (e.g., in a blue font) and the amount of time remaining (e.g., in a red font) in the viewing period (if viewing has been initiated) may be presented. Other information such as the play time of the video title, the rating that the movie received (e.g., Rated PG-13), and the like, may also be provided. In this arrangement, a play button 1002 and a delete button 1004 are also included in the GUI 1000. By selecting the play button 1002, the playback is initiated and if playback of the video title had not been previously initiated, the countdown of the viewing period (e.g., twenty-four hours) is initiated. By selecting the delete button 1004, the video title may be deleted from the viewing device and the video rental system 102 may be alerted to correspondingly end the rental time period and viewing time period for this particular title rental for this user.

Figure 11:
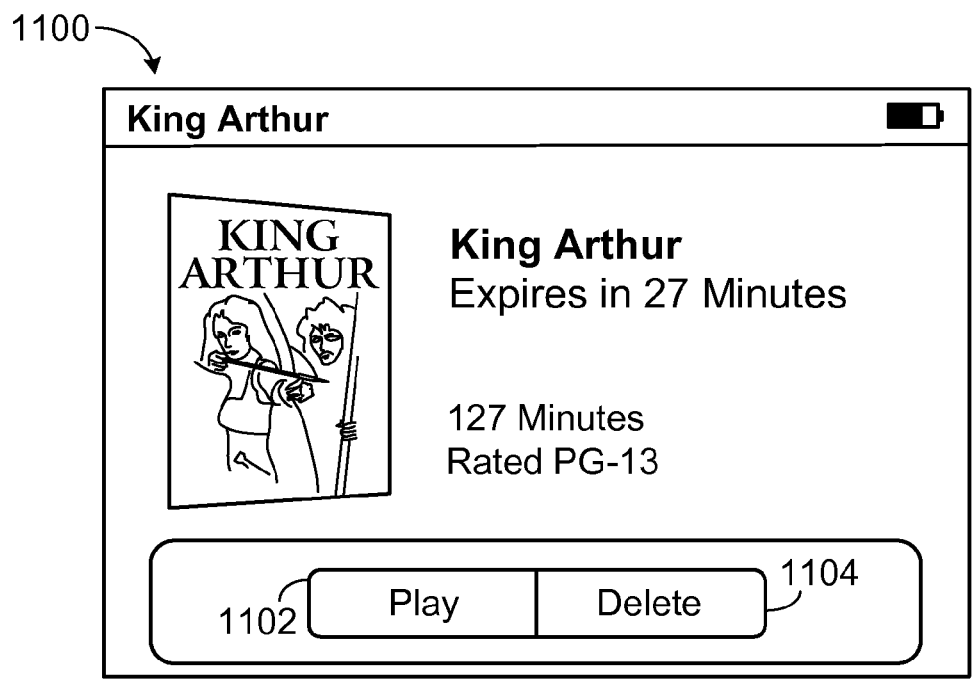

Referring to FIG. 11, a GUI 1100 is presented that includes content similar to the GUI 1000 (shown in FIG. 10). However, in this particular situation, the viewing period of the selected video title had been previously initiated. As such, the amount of time remaining (e.g., 27 minutes) is presented (e.g., in a red font) to alert the user. Similar to the GUI 1000, the GUI 1100 includes a play button 1102 and a delete button 1104 to respectively play or delete the selected title.

Figure 12:
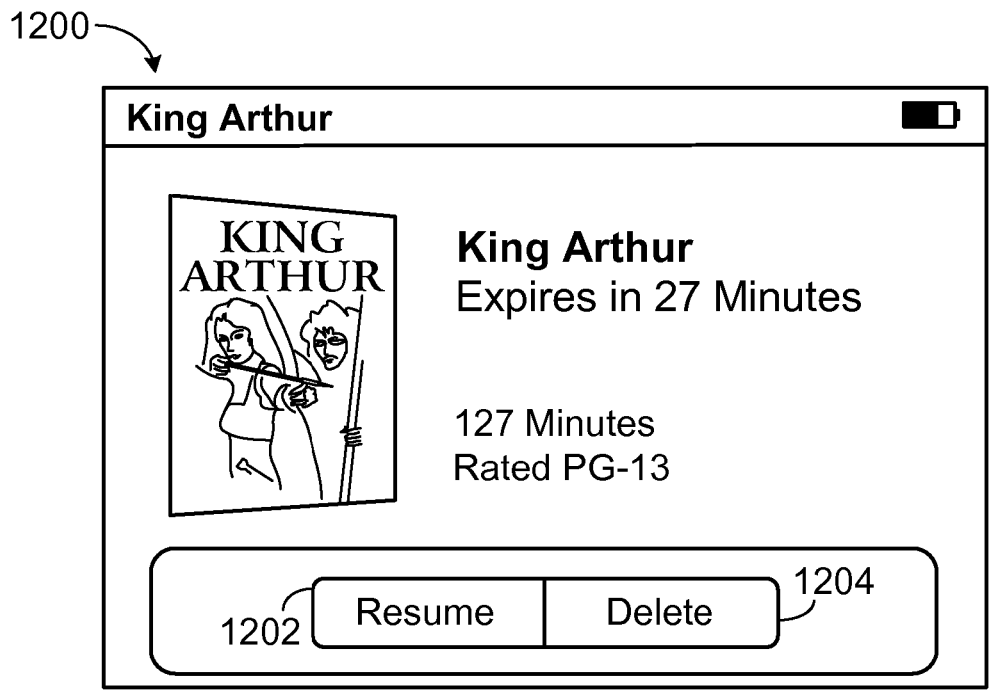

Referring to FIG. 12, a GUI 1200 is presented that allows a user to pause a video title that is currently in playback. By pausing playback, another task or process may be initiated on the viewing device by the user. Upon returning to resume playback, the GUI 1200 is presented that includes a select- able resume button 1202 (in place of the play button 1102). By selecting the resume button 1202 playback of the video title resumes. Similar to the GUI 1100, a delete button 1204 is included in the GUI 1200 for initiating deletion of the video title, if desired by the user.

Figure 13:
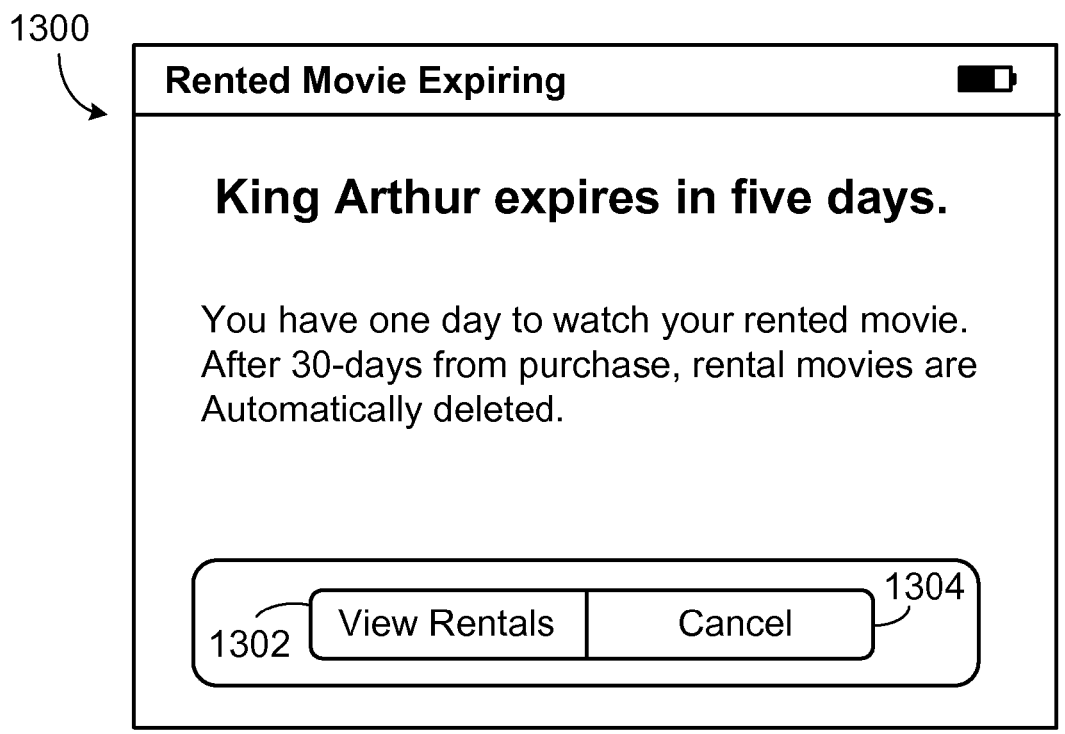

Referring to FIG. 13, one or more types of messages and information may be provided to the user from the video rental system 102 (via the viewing device). For example, the user may be alerted in a predefined or periodic fashion regarding the expiration of the rental period and/or viewing period of a rented video title. For example, a GUI 1300 may be presented to alert the user that only a particular portion (e.g., five days) remains in a rental period prior to expiration. In this example, the user is alerted that for one rented movie, one day of the rental period remains to view the movie. Based upon this alert, the user may desire to review all of his or her rentals. As such a view rental button 1302 is included in the GUI 1300, which when selected, present the rental associated with the viewing device (e.g., GUI 900 of FIG. 9). A cancel button 1304 is also included in the GUI 1300 so that the user may dismiss the GUI.

Figure 14:
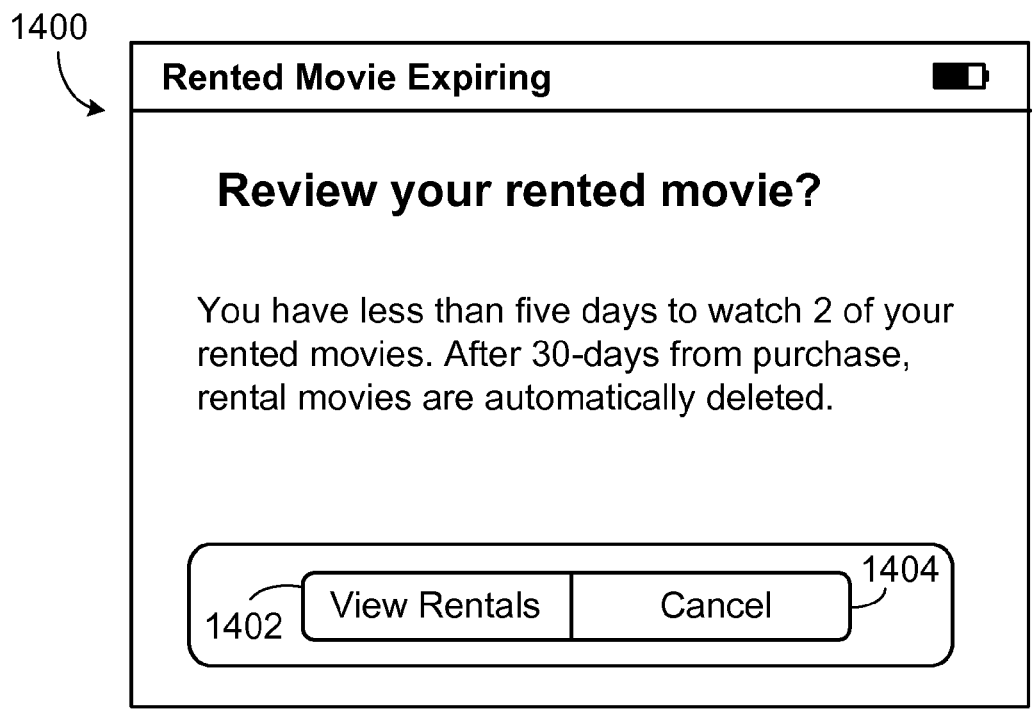

Referring to FIG. 14, another GUI 1400 is illustrated that provides an alert to the expiration of one or more rental periods. In this example, the user is alerted that rental periods of two video titles will expire in live days. As such a view rentals button 1402 is included in the GUI 1400 so that the user can select to view the list of current rentals and associated information (e.g., remaining rental time periods). A cancel button 1404 is also provided to dismiss the GUI 1400.

Figure 15:
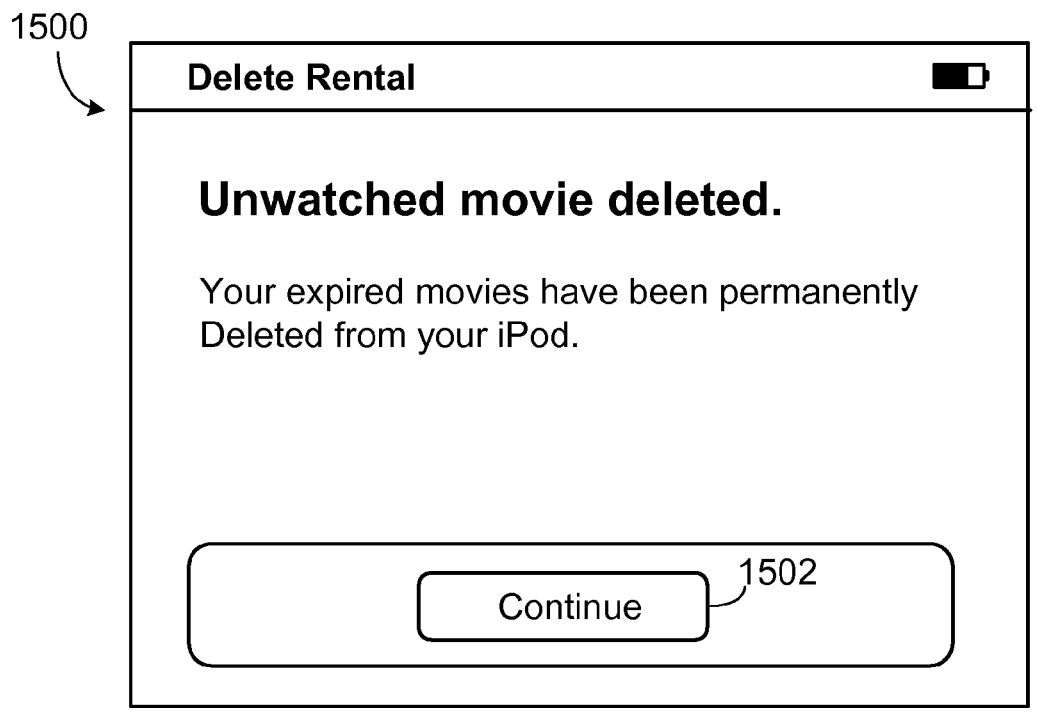

Referring to FIG. 15, if a video title is not viewed within the video rental period (e.g., thirty days), the period expires and the content of the video title is automatically removed from the storage unit of the viewing device (e.g., iPod). By removing the content, memory space of the storage unit is conserved for other types of content (e.g., other rentals). The user may also re-rent the removed video title to be granted a new rental period and viewing period in which to view the title. For the situation in which the rental period of one or more video titles has expired, the corresponding content of the titles may be removed and a GUI 1500 may be presented on the viewing device. In this example, the GUI 1500 includes a continue button 1502 so that the user may dismiss the GU 1500 and return to other operations (e.g., viewing a video title).

Figure 16:
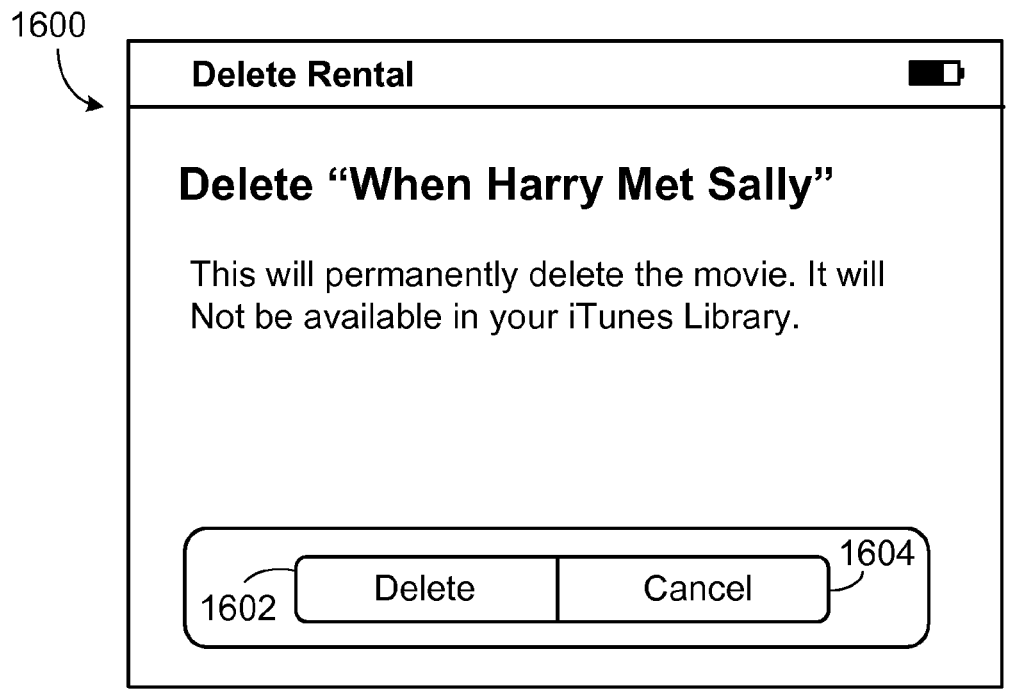

Referring to FIG. 16, rather than the expiration of a video rental period initiating the removal of a video title from a viewing device, other events may initiate content removal. For example, a user may selectively remove one or more video titles from a user account (e.g., an iTunes library) and a viewing device. Upon selecting to remove a video title, a GUI 1600 may be presented on the viewing device to confirm the removal. A delete button 1602 is provided for the user to select to delete the video title. To disregard the deletion, a user selectable cancel button 1604 is also included in the GUI 1600. If deletion is selected, the video title can be removed from the viewing device prior to removing the video title from a user account. For example, a video title may be flagged for deletion from a viewing device such as an iPod once the delete button 1602 is selected by a user. At a later time, the video content may be removed from the device and from the corresponding user account (e.g., when the iPod is connected to a computer system such as computer system 104).

Figure 17:
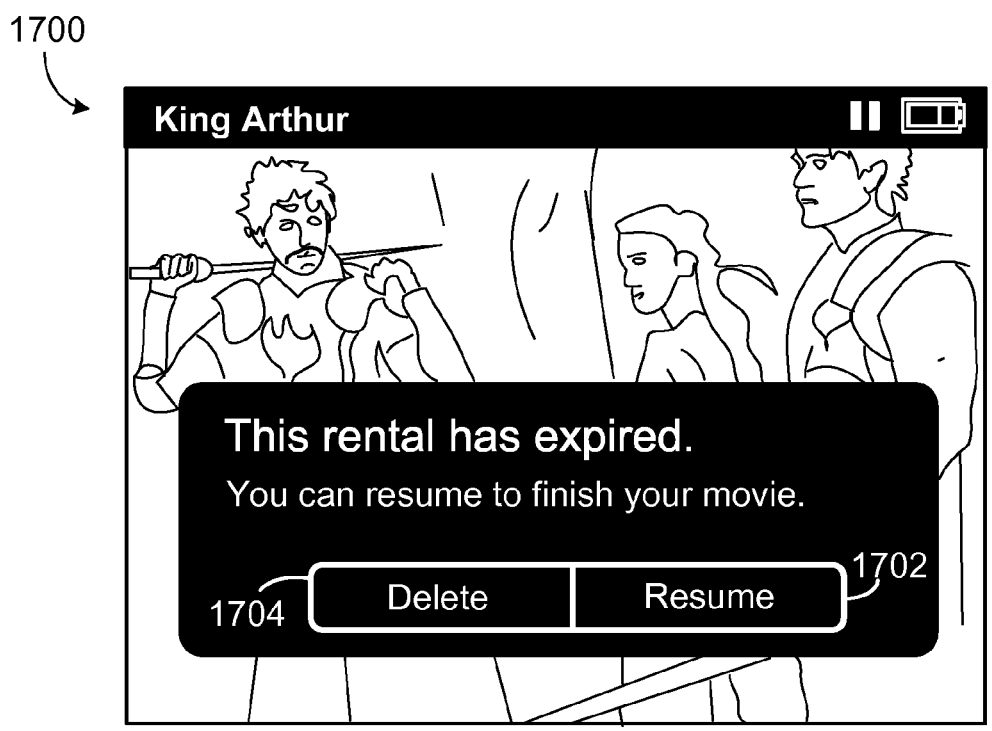

Referring to FIG. 17, as mentioned in regards to the timelines shown in FIGS. 3 and 4, a user is provided a video rental period (e.g. thirty days) for rental playback. As such, a user may decide to initiate playback moments before the expiration of the video rental period. In such situations, a user may be allowed to playback the video title beyond the expiration of the rental period (e.g., beyond thirty days). However, for that situation, if playback is paused or stopped (once the video rental period has expired), and the video is not viewed to completion, the video rental period may be considered expired, and the video title may be automatically removed. In the alternative, in some arrangements the user may be allowed to stop or pause playback (after the video rental period has expired) and still be allowed to resume playback. Referring to the figure, a GUI 1700 is presented in which the user is alerted that the rental period of the video title has expired. However, if the playback is resumed, the video may be viewed to completion. A resume button 1702 is included in the GUI 1700 so that the user may resume viewing until completion of the video title. A delete button 1704 is also included in the GUI 1700 so a user may select to remove the video title without viewing the title to completion.

Figure 18:
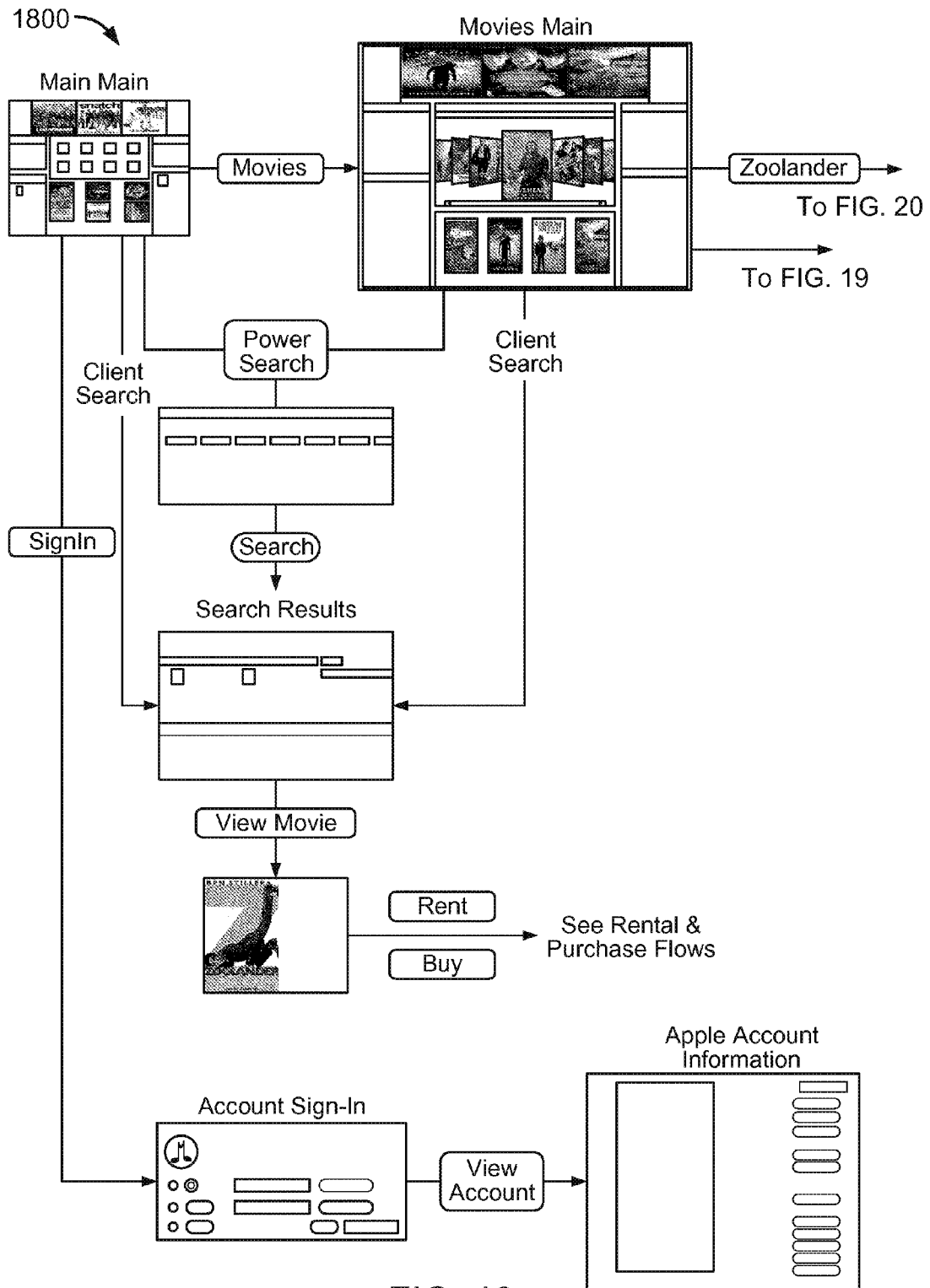
FIGS. 18-20 are flow charts that represent rental and purchase operations.

Referring to FIG. 18, a flowchart 1800 is presented that illustrates a series of GUIs (and associated operations) for renting and purchasing content such as video titles. Generally, a series of GUIs allow a user to select one or more titles for rental and/or purchase. In one implementation, the GUIs may be provided by a software application, which transfers music, photo and video content (e.g., "iTunes" application from Apple, Inc. of Cupertino, Calif.). Once a user is recognized and authorized to enter a corresponding user account, titles may be selected (along with viewing account information). One or more search techniques and methodologies may be implemented for identifying titles that may be of interest to the user.

Figure 19:
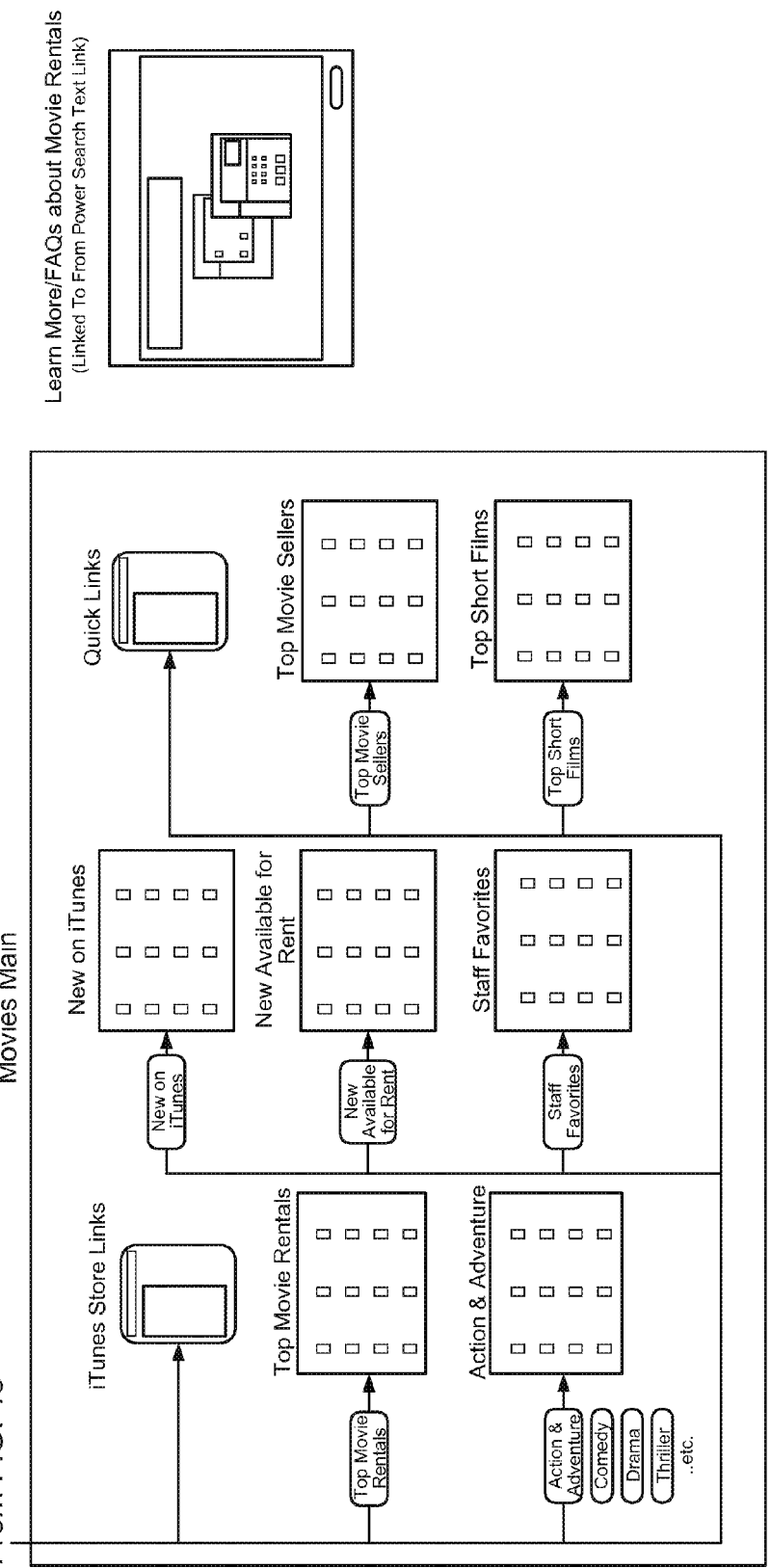

Referring to FIG. 19, a series of GUIs are presented that may be used to assist a user to identify one or more video titles of interest. For example, lists of top video rentals, top video purchases and top short films may be presented in one or more GUIs to the user. A list of favorite video titles from a particular group of individuals (e.g., staff members, user, user of similar age and background, etc.) may also be presented. Rental availability may also be presented in a GUI along with rentals based upon a common genre or theme (e.g., action, comedy, drama, horror, etc.). One or more GUIs may also be presented to provide general and specific information regarding the video titles that may be rented and the video rental system 102.

Figure 20:
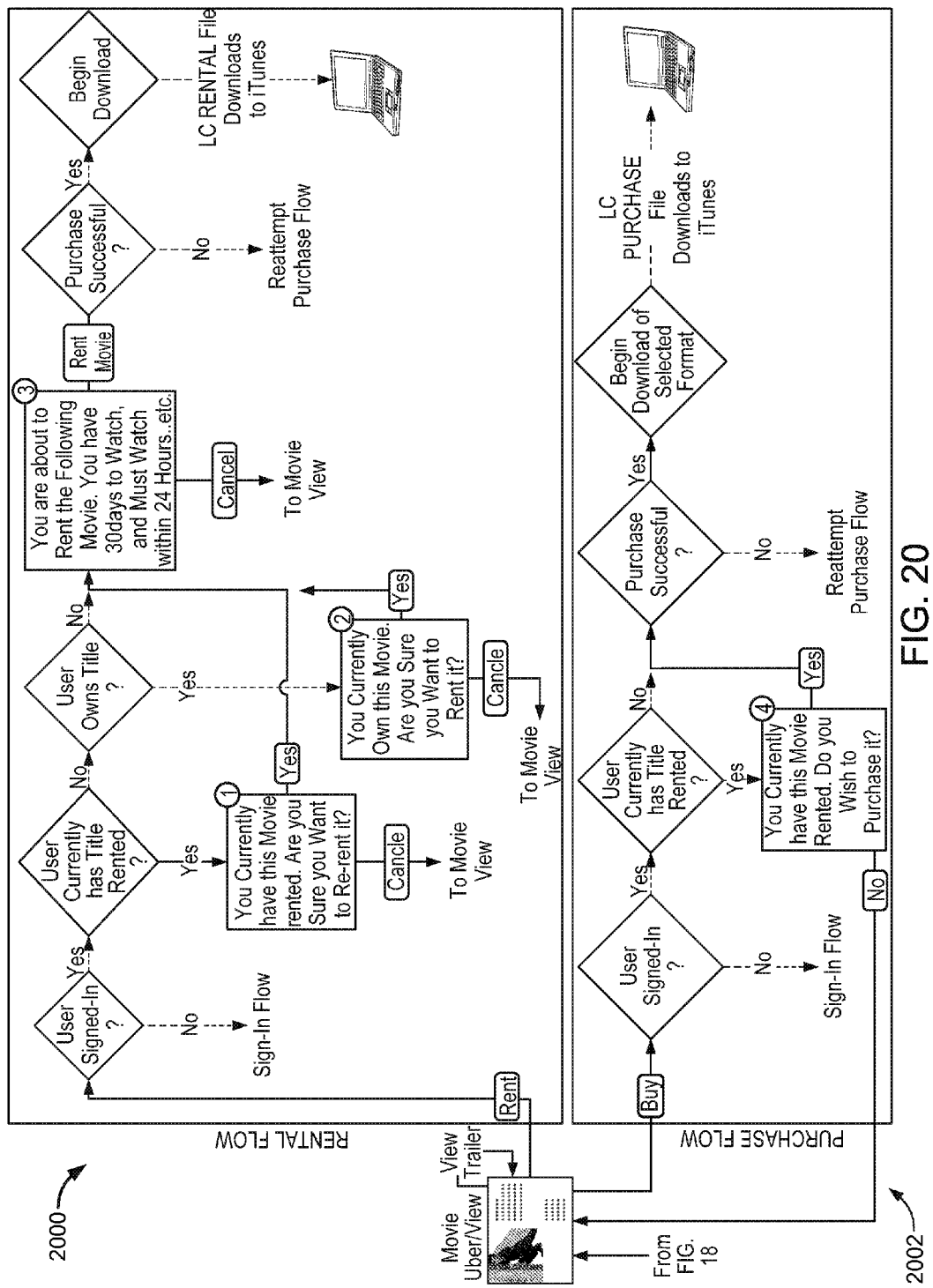

Referring to FIG. 20, a flow chart 2000 represents some operations for renting a video title, while another flow chart 2002 represents some operations for purchasing a video title. Operations including checking if the user requesting a rental has properly entered the video rental system (e.g., provided a valid username and password). Operations also include determining if the requested rental has been previously rented to the user and if the requested rental is currently in an active rental period. In such a situation, the user may be alerted. Similarly, operations may include determining if the user has previously purchased the video title. Upon determining that the rental is proper, operations may include initiating the download of the video title (e.g., LC rental file downloads to iTunes).

The flow chart 2002 that represents operations to purchase a video title may also include determining if the user has properly logged into the video rental system and determining if the video title of interest (for purchase) is currently being rented by the user. In such a situation the user may be asked if he or she still would like to purchase the video title (even though it is being rented). Upon determining that the user wants to continue the purchase, the purchase is finalized the appropriate files are downloaded to the user iTunes account.

Figure 21:
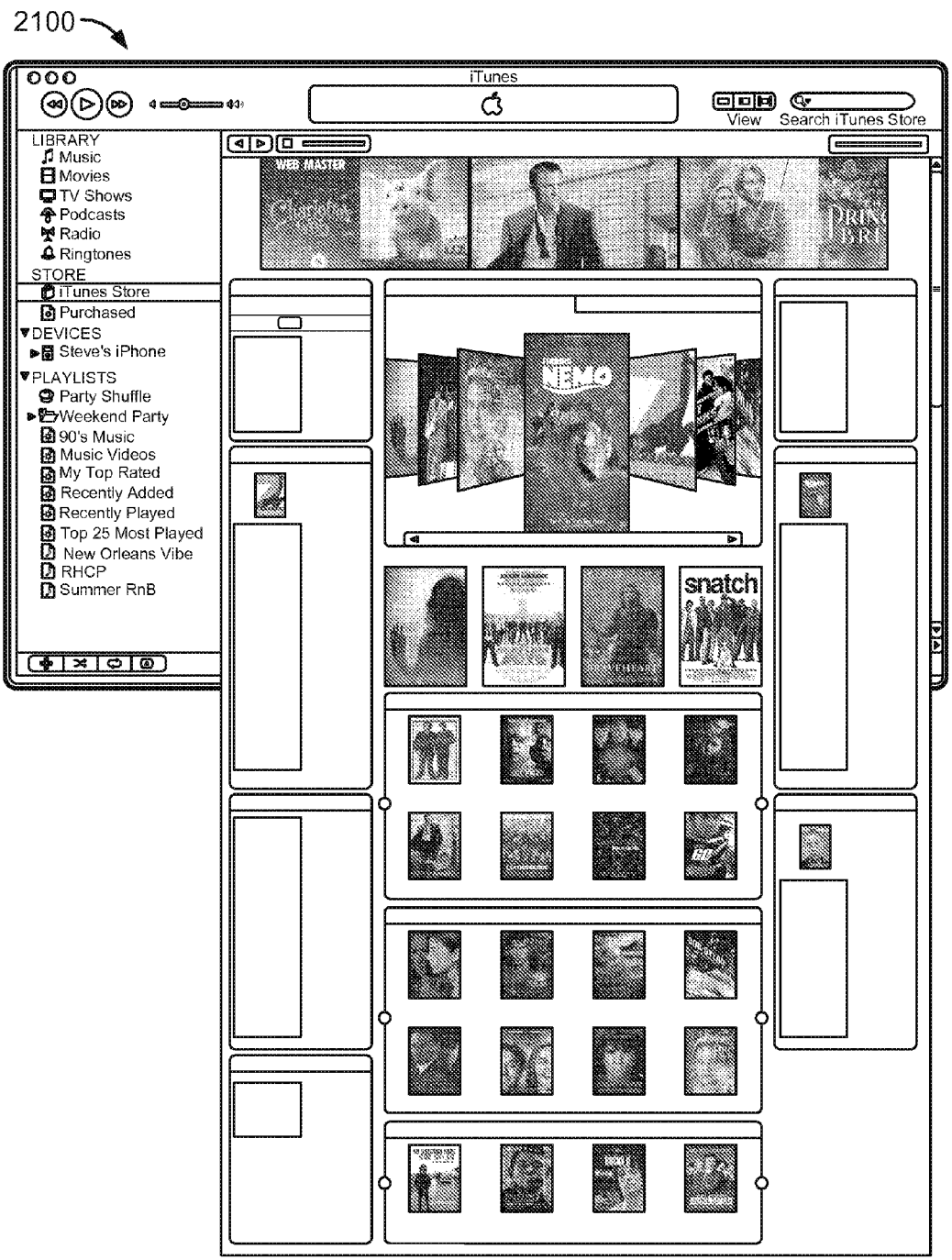
FIGS. 21-28 are graphical user interfaces.

Referring to FIG. 21, a GUI 2100 is presented that provides a possible illustration of video titles that are available for rental or purchase. As mentioned above with respect to FIG. 18, list of video titles may be provided to assist the user in his or her selection. New arrival video title may also be listed.

Figure 22:
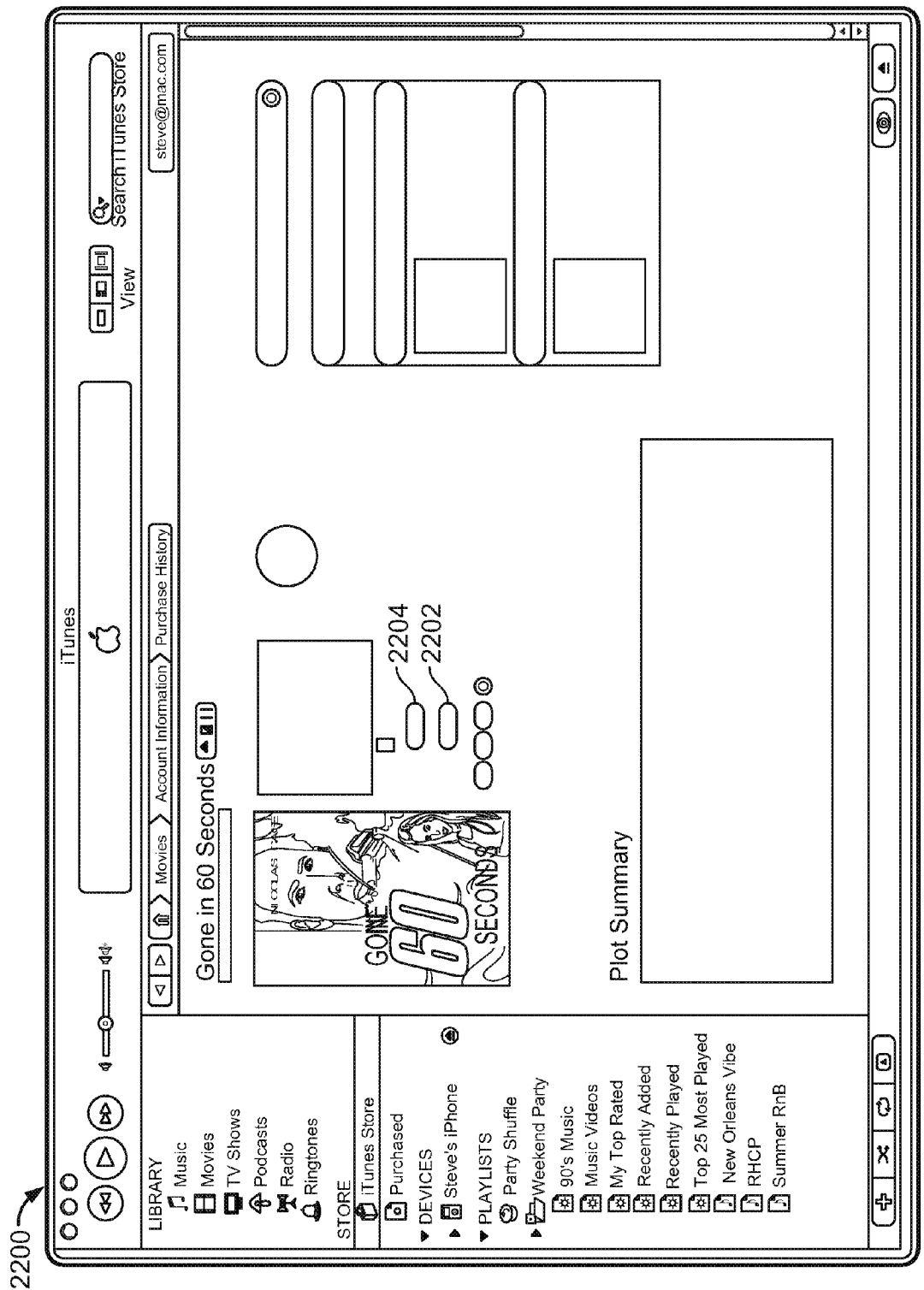
Figure 23:
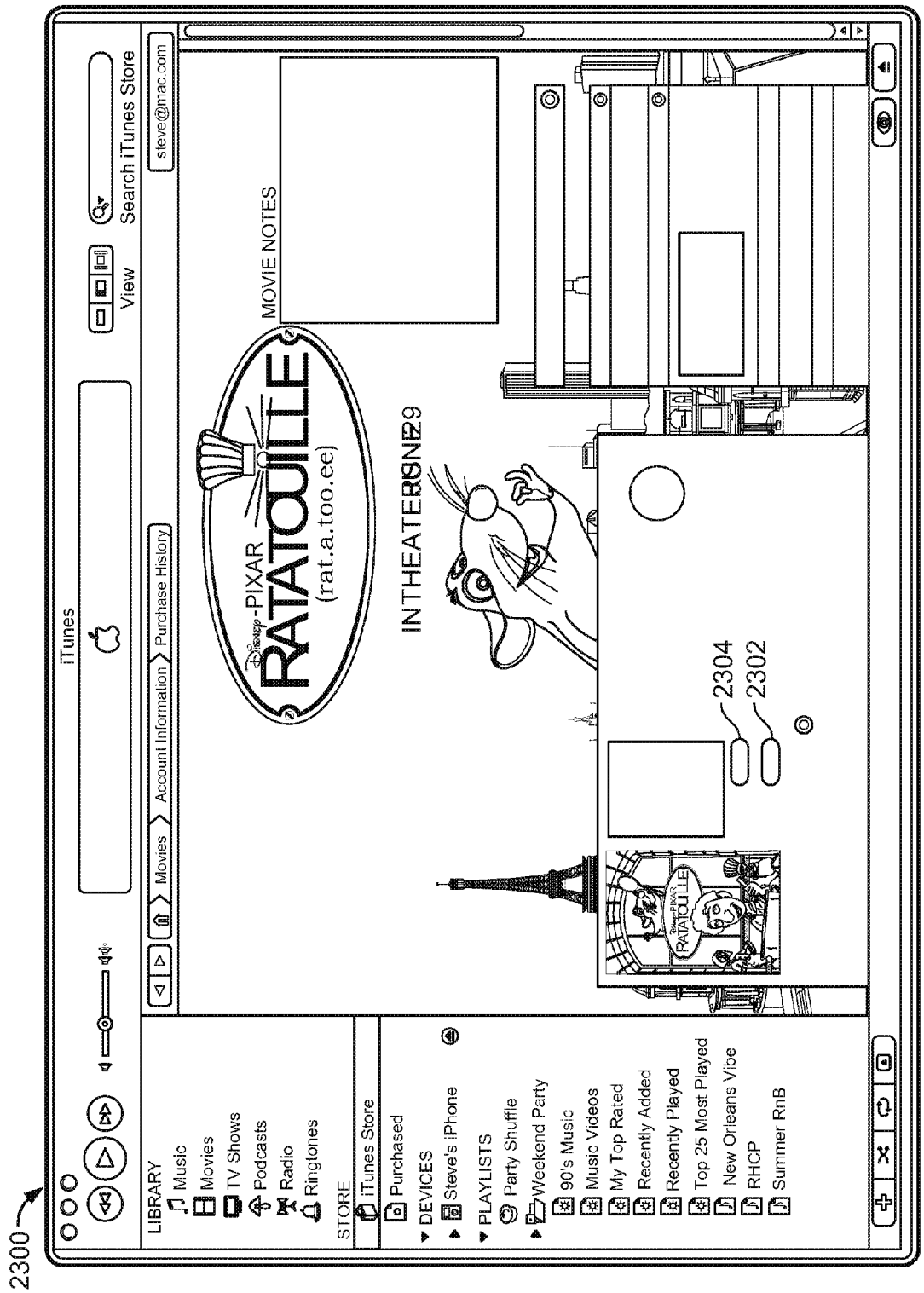

Referring to FIG. 22, a GUI 2200 is presented that provides information associated with a particular title. Along with cover art, running time, rating, file size and a plot summary, a buy button 2202 is included in the GUI 2200 for initiating a purchase and a rent button 2204 is included to initiate a rental of the video title. Referring to FIG. 23, a GUI 2300 provides another arrangement of information that includes a purchase button 2302 and a rental button 2304 for a particular video title.

Figure 24:
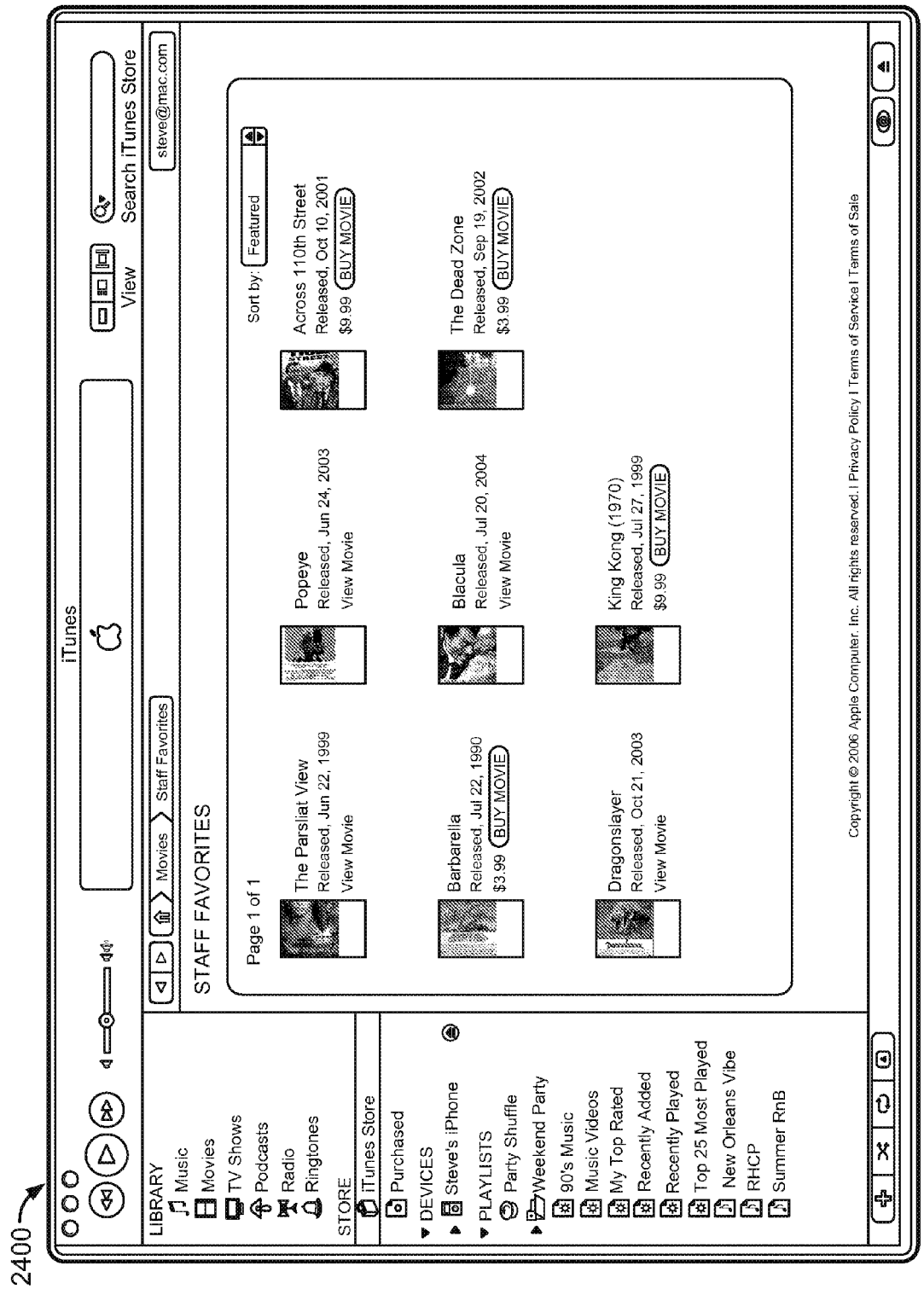

Referring to FIG. 24, a GUI 2400 is presented that provides a list of favorite video titles, in particular, this list of favorites is provided by staff members. For each available video title, a link is provided for purchasing or renting the title. For example, a purchase button (labeled 'Buy Movie') for initiating purchase of the title. Similarly, a rent button (labeled 'Rent Movie') may be positioned next to a graphic of an available video title to signify that the title may be rented. A text link (e.g., labeled 'View Movie') may be placed next to a graphic of a video title to indicate that the title is available for rent and purchase. By selecting the graphic, title, or text link, the user is provided a page associated with the title (e.g., GUI 2300) for buying or renting the title.

Figure 25:
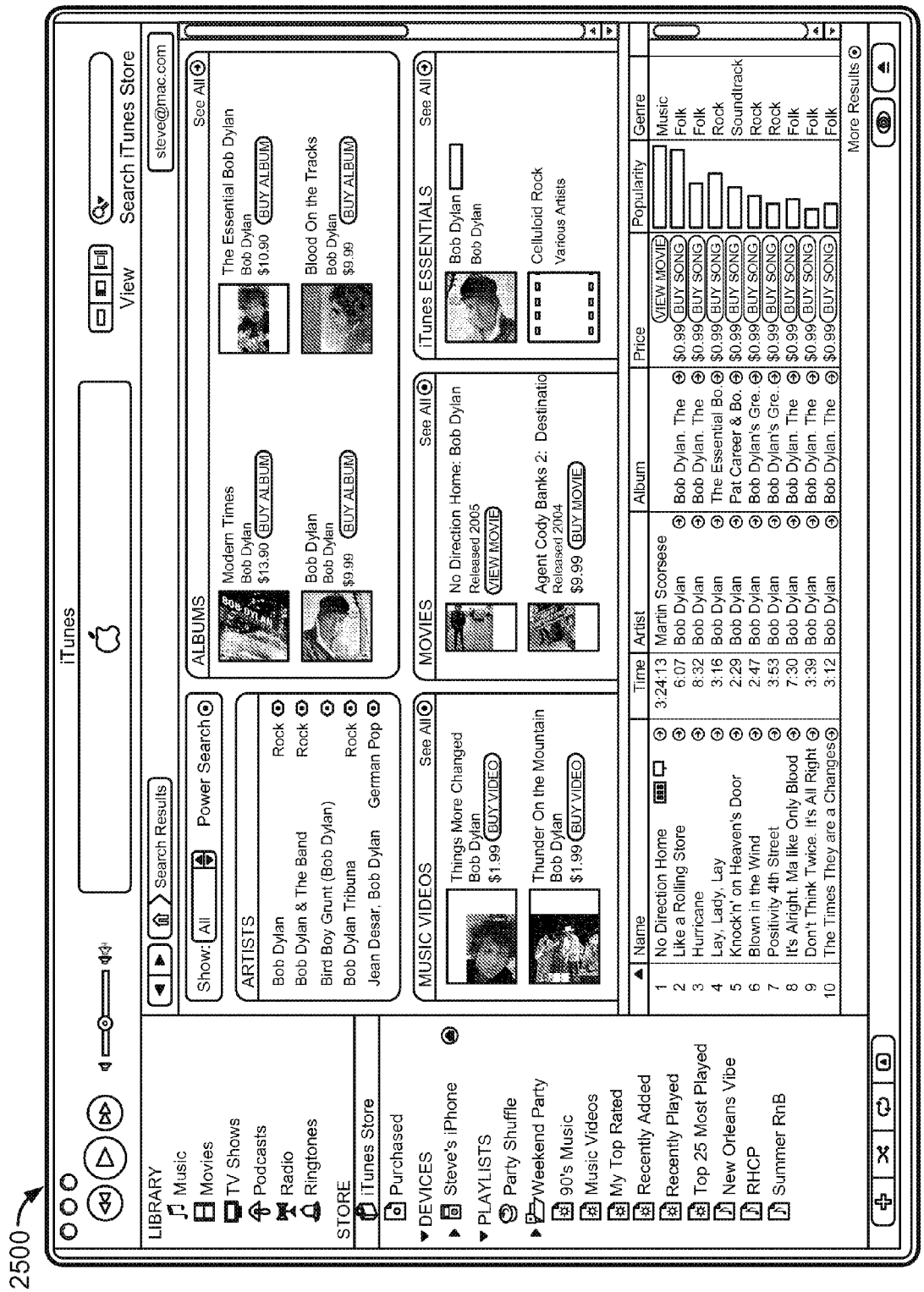

Referring to FIG. 25, a GUI 2500 is presented that provides one or more search capabilities for sorting through content based upon one or more criteria. For example, content (e.g., albums, movies, music videos, etc.) may be searched based upon an artist (e.g., Bob Dylan), a band, a song, or other type of information. By performing the search a user may relatively quickly identify content that may be purchased or rented.

Figure 26:
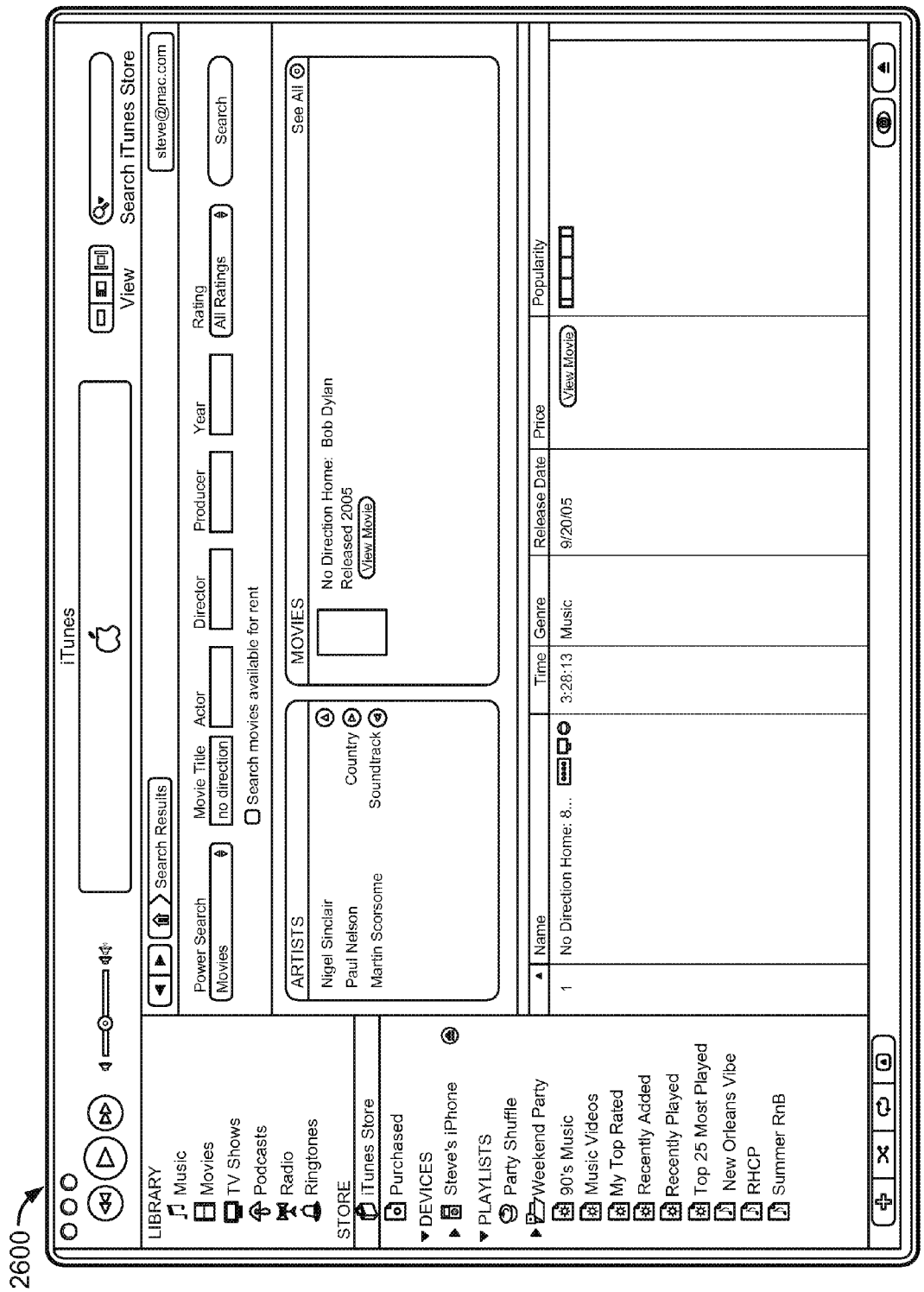

Referring to FIG. 26, a GUI 2600 is presented that allows searches to be executed to identify content. A user may search based on various criteria about the content such as the title of the content, actors and directors who participated in making the content, the description of the content, the year the content was created, and a rating of the content. As such a user may filter out content that is only available for purchase and attain a list of content that may me rented (and viewed prior to deciding whether or not to purchase).

Figure 27:
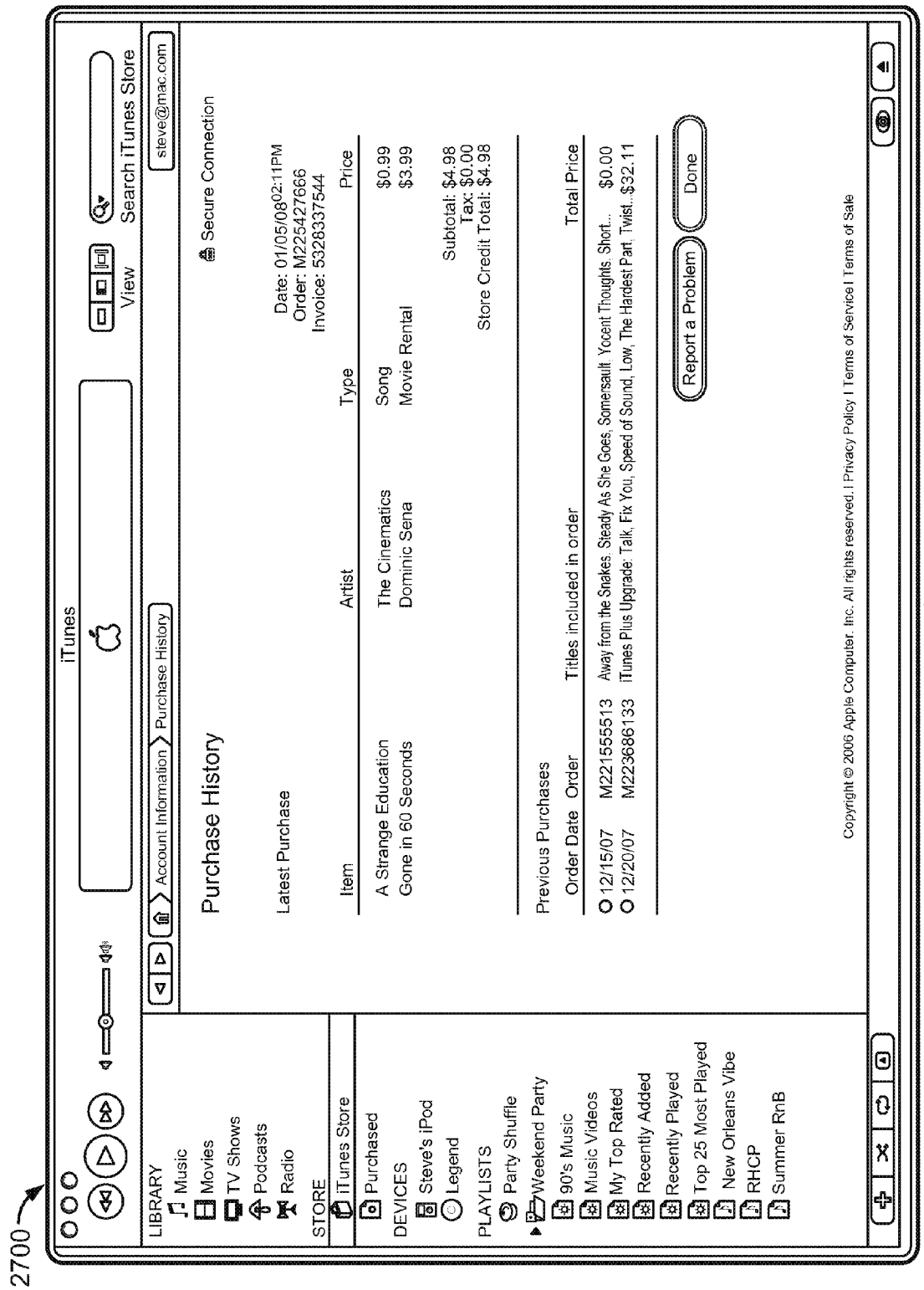

Referring to FIG. 27, a GUI 2700 is presented that provides a user with a history of his or her purchases along with other types of information. For example, along with reporting the purchase of individual content titles (e.g., songs, albums, movies, etc.) the GUI 2700 also reports the rentals of the user. In particular, within the column labeled "Type", along with "song" a rental of a video title may be indicated with the phrase "Movie Rental".

Figure 28:
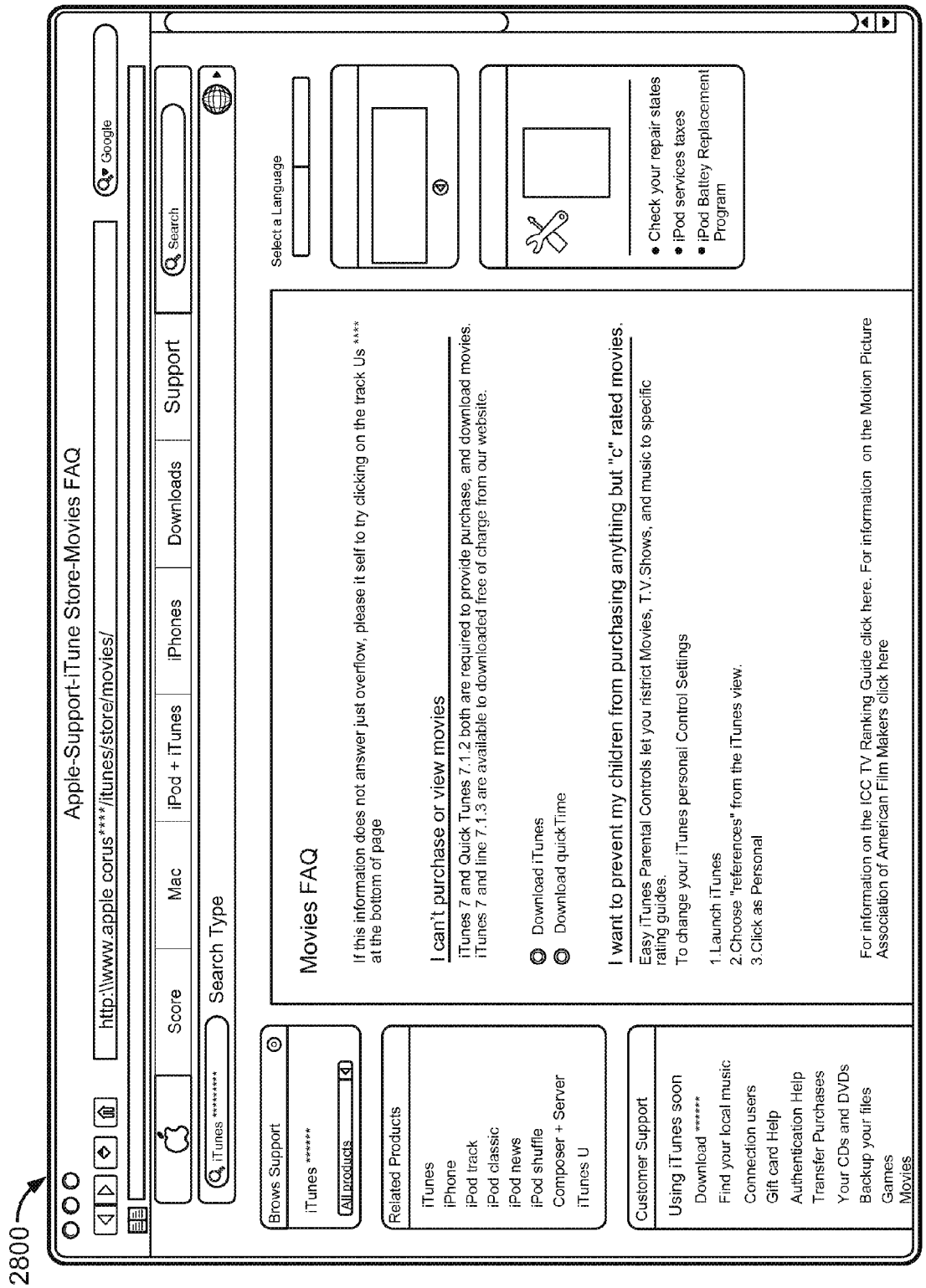

Referring to FIG. 28, a GUI 2800 is presented that provides a list of facts and information that may assist a user in purchasing and renting content such as video titles. For example, the GUI may contain which appropriate software and which versions of the software are needed to playback rented or purchased titles. Parental control information may also be provided so that a parent can control the type of content that his or her child may purchase or rent.

The apparatus, methods, flow diagrams, and structure block diagrams described in this patent document can be implemented in computer processing systems including program code comprising program instructions that are executable by the computer processing system. Other implementations can also be used. Additionally, the flow diagrams and structure block diagrams described in this patent document, which describe particular methods and/or corresponding acts in support of steps and corresponding functions in support of disclosed structural means, can also be utilized to implement corresponding software structures and algorithms, and equivalents thereof.

The apparatus, methods, flow diagrams, and structure block diagrams described in this patent document can be implemented in computer processing systems including program code comprising program instructions that are executable by the computer processing system. Other implementations can also be used. Additionally, the flow diagrams and structure block diagrams described in this patent document, which describe particular methods and/or corresponding acts in support of steps and corresponding functions in support of disclosed structural means, can also be utilized to implement corresponding software structures and algorithms, and equivalents thereof.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art can effect alterations, modifications and variations to the examples without departing from the scope of the invention.

Other embodiments are within the scope of the following claims. The techniques described herein can be performed in a different order and still achieve desirable results.

The invention claimed is:

1. A method, comprising:
receiving, at a content rental device, a request from a viewing device to rent a content item;
in response to receiving the request, transferring the content item from the content rental device to the viewing device;
commencing a rental period, wherein the rental period begins when playback of the content item is initiated or when the transfer of the content item has been completed;
receiving, at the content rental device from the viewing device, an indication that playback of the content item has been initiated within the rental period; and
commencing a viewing period and a playback period for viewing playback of the content item, wherein both the viewing period and the playback period begin when the content rental device receives the indication that playback of the content item has been initiated, and wherein the viewing period is less than the rental period and greater than the playback period.

2. The method of claim 1, further comprising allowing playback of the content item to continue after expiration of the viewing period and issuing an alert indicating that playback of the content item cannot be restarted when playback is paused or stopped after the viewing period has expired.

3. The method of claim 2, further comprising:
determining that playback is paused after expiration of the viewing period; and
terminating playback of the content item.

4. The method of claim 1, further comprising:
receiving a request to view the content item from a second viewing device;
determining that the second viewing device is associated with a same user account as the viewing device;
determining that the rental period or viewing period has not expired; and
sending the content item to the second viewing device.

5. The method of claim 4, further comprising:
determining that the second viewing device is capable of viewing the content item by determining whether a hardware profile of the second viewing device supports video playback.

6. The method of claim 4, further comprising:
determining that the second viewing device is capable of storing at least a portion of the content item; and
sending at least a portion of the content item to the second viewing device.

7. The method of claim 1, further comprising:
transmitting, to a digital rights management server, a request to authorize access to the content item; and
receiving, from the digital rights management server, authorization to transmit the content item to the viewing device.

8. A non-transitory computer-readable medium including one or more sequences of instructions that, when executed by one or more processors, cause the one or more processors to:
receive, at a content rental device, a request from a viewing device to rent a content item;
responsive to receiving the request, transfer the content item from the content rental device to the viewing device;
commence a rental period, wherein the rental period begins when playback of the content item is initiated or when the transfer of the content item has been completed;
receive, at the content rental device, an indication from the viewing device that playback of the content item has been initiated within the rental period; and commence a viewing period and a playback period for viewing playback of the content item, wherein both the viewing period and the playback period begin when the content rental device receives the indication that playback of the content item has been initiated, and wherein the viewing period is less than the rental period and greater than the playback period.

9. The non-transitory computer-readable medium of claim 8, comprising further instructions that, when executed by the one or more processors, cause the one or more processors to:
allow playback of the content item to continue after expiration of the viewing period and issue an alert indicating that playback of the content item cannot be restarted when playback is paused or stopped after the viewing period has expired.

10. The non-transitory computer-readable medium of claim 9, comprising further instructions that, when executed by the one or more processors, cause the one or more processors to:
determine that playback is paused after expiration of the viewing period; and
terminate playback of the content item.

11. The non-transitory computer-readable medium of claim 8, comprising further instructions that, when executed by the one or more processors, cause the one or more processors to:
receive a request to view the content item from a second viewing device;
determine that the second viewing device is associated with a same user account as the viewing device;
determine that the rental period or viewing period has not expired; and
send the content item to the second viewing device.

12. The non-transitory computer-readable medium of claim 11, comprising further instructions that, when executed by the one or more processors, cause the one or more processors to:
determine that the second viewing device is capable of presenting the content item by
determining whether a hardware profile of the second viewing device supports video playback.

13. The non-transitory computer-readable medium of claim 11, comprising further instructions that, when executed by the one or more processors, cause the one or more processors to:
determine that the second viewing device is capable of storing at least a portion of the content item; and
send at least a portion of the content item to the second viewing device.

14. The non-transitory computer-readable medium of claim 8, comprising further instructions that, when executed by the one or more processors, cause the one or more processors to:
transmit, to a digital rights management server, a request to authorize access to the content item; and
receive, from the digital rights management server, authorization to transmit the content item to the viewing device.

15. A system comprising:
one or more processors; and
a computer-readable medium including one or more sequences of instructions that, when executed by the one or more processors, cause the one or more processors to:
receive, at a content rental device, a request from a viewing device to rent a content item;
in response to receiving the request, transfer the content item from the content rental device to the viewing device;
commence a rental period, wherein the rental period begins when playback of the content item is initiated or when the transfer of the content item has been completed;
receive, at the content rental device, an indication from the viewing device that playback of the content item has been initiated within the rental period; and
commence a viewing period and a playback period for viewing playback of the content item, wherein both the viewing period and the playback period begin when the content rental device receives the indication that playback of the content item has been initiated, and wherein the viewing period is less than the rental period and greater than the playback period.

16. The system of claim 15, wherein the one or more sequences of instructions comprise instructions that, when executed by the one or more processors, cause the one or more processors to:
allow playback of the content item to continue after expiration of the viewing period and issue an alert indicating that playback of the content item cannot be restarted when playback is paused or stopped after the viewing period has expired.

17. The system of claim 16, wherein the one or more sequences of instructions comprise instructions that, when executed by the one or more processors, cause the one or more processors to:
determine that playback is paused after expiration of the viewing period; and
terminate playback of the content item.

18. The system of claim 15, wherein the one or more sequences of instructions comprise instructions that, when executed by the one or more processors, cause the one or more processors to:
receive a request to view the content item from a second viewing device;
determine that the second viewing device is associated with a same user account as the viewing device;
determine that the rental period or viewing period has not expired; and
send the content item to the second viewing device.

19. The system of claim 18, wherein the one or more sequences of instructions comprise instructions that, when executed by the one or more processors, cause the one or more processors to:
determine that the second viewing device is capable of presenting the content item by determining whether a hardware profile of the second viewing device supports video playback.

20. The system of claim 18, wherein the one or more sequences of instructions comprise instructions that, when executed by the one or more processors, cause the one or more processors to:
determine that the second viewing device is capable of storing at least a portion of the content item; and
send at least a portion of the content item to the second viewing device.

21. The system of claim 15, wherein the one or more sequences of instructions comprise instructions that, when executed by the one or more processors, cause the one or more processors to:
transmit, to a digital rights management server, a request to authorize access to the content item; and receive, from the digital rights management server, authorization to transmit the content item to the viewing device.

\* \* \* \* \*